(12) United States Patent
Yamamoto et al.

(10) Patent No.: US 8,102,087 B2
(45) Date of Patent: Jan. 24, 2012

(54) DRIVE DEVICE THAT IS REDUCED IN SIZE WHILE MAINTAINING HIGH AXIAL CENTER ACCURACY OF A ROTOR SHAFT

(75) Inventors: Yoshihisa Yamamoto, Anjo (JP); Natsuki Sada, Anjo (JP); Tomohiko Ito, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 198 days.

(21) Appl. No.: 12/453,423

(22) Filed: May 11, 2009

(65) Prior Publication Data

US 2009/0295242 A1 Dec. 3, 2009

(30) Foreign Application Priority Data

May 30, 2008 (JP) .................................. 2008-143846

(51) Int. Cl.
*H02K 7/116* (2006.01)
(52) U.S. Cl. ........................... 310/83; 310/75 R; 310/80
(58) Field of Classification Search ................. 310/83, 310/112, 113; 180/65.21, 65.24, 65.25; 903/906, 903/910, 951, 952
See application file for complete search history.

(56) References Cited

U.S. PATENT DOCUMENTS

| | | |
|---|---|---|
| 5,382,854 A | 1/1995 | Kawamoto et al. |
| 5,513,719 A | 5/1996 | Moroto et al. |
| 2006/0022528 A1 | 2/2006 | Burgman et al. |
| 2006/0040782 A1* | 2/2006 | Diemer et al. ............... 475/269 |
| 2007/0225098 A1* | 9/2007 | Tabata et al. ................... 475/5 |
| 2008/0173484 A1 | 7/2008 | Umemura et al. |

FOREIGN PATENT DOCUMENTS

| | | | |
|---|---|---|---|
| JP | 06024248 A | * | 2/1994 |
| JP | A-06-048192 | | 2/1994 |
| JP | A-06-328950 | | 11/1994 |
| JP | A-2002-142408 | | 5/2002 |
| JP | A-2004-248449 | | 9/2004 |
| JP | 2005212494 A | * | 8/2005 |
| JP | A-2006-262533 | | 9/2006 |
| JP | A-2007-057015 | | 3/2007 |
| JP | A-2007-159287 | | 6/2007 |

* cited by examiner

*Primary Examiner* — Quyen Leung
*Assistant Examiner* — Eric Johnson
(74) *Attorney, Agent, or Firm* — Oliff & Berridge, PLC

(57) ABSTRACT

A drive device includes a rotating electrical machine; a planetary gear unit positioned radially inside the rotating electrical machine so as to axially overlap the rotating electrical machine; a through shaft extending radially inside and through a sun gear of the planetary gear unit; and a case that accommodates the rotating electrical machine and the planetary gear unit. The through shaft is supported by the case on both axial sides of the planetary gear unit, and a rotor of the rotating electrical machine is connected integrally with the sun gear and is rotatably supported at two axial positions, the rotor is supported at a first axial position of the two axial positions by the case, and the rotor is supported at a second axial position of the two axial positions at a position radially inside the sun gear by the through shaft.

20 Claims, 6 Drawing Sheets

DRIVE DEVICE THAT IS REDUCED IN SIZE WHILE MAINTAINING HIGH AXIAL CENTER ACCURACY OF A ROTOR SHAFT

INCORPORATION BY REFERENCE

The disclosure of Japanese Patent Application No. JP 2008-143846 filed on May 30, 2008, including the specification, drawings and abstract is incorporated herein by reference in its entirety.

BACKGROUND

The present invention relates to a drive device.

In recent years, various electric vehicles and hybrid vehicles have been developed due to environmental concerns, decrease in crude oil reserves, and the like. For example, a known drive device for a hybrid vehicle has an input shaft connected to an engine, a rotating electrical machine, a planetary gear unit, and an output member, which are arranged coaxially. In such a drive device, one of the coaxially positioned components is preferably positioned so as to axially overlap another component in order to reduce the axial dimension of the drive device and thus reduce the overall size of the drive device.

Japanese Patent Application Publication No. JP-A-2006-262553 (FIG. 2, and the like) describes a vehicle drive device in which ring gears of two planetary gear units are provided integrally with an output member, and the two planetary gear units are positioned radially inside the output member so as to axially overlap the output member. By using this structure, the overall axial dimension of the drive device can be reduced as compared to the case where the two planetary gear units and the output member are sequentially arranged along the axial direction. Regarding the support structure of a rotor shaft of a rotating electrical machine in this vehicle drive device, the rotor shaft is rotatably supported by a case through a bearing on both axial sides. By using this structure, high axial center accuracy of the rotor shaft can be maintained, and an appropriate clearance between a rotor and a stator of the rotating electrical machine can always be ensured. As a result, the generation of vibration and noise due to rotation of the rotating electrical machine can be suppressed.

Japanese Patent Application Publication No. JP-A-H6-328950 (Paragraph [0055], FIG. 6, and the like) describes a vehicle drive device in which a planetary gear unit is positioned radially inside a rotating electrical machine so as to axially overlap the rotating electrical machine. By using this structure, the overall axial dimension of the drive device can be reduced as compared to the case where the rotating electrical machine and the planetary gear unit are sequentially arranged along the axial direction.

SUMMARY

In the vehicle drive device described in Japanese Patent Application Publication No. JP-A-2006-262553, however, the output member integrated with the ring gears of the two planetary gear units is supported through a bearing at a radially outer position. The bearing rotatably supporting the output member therefore has a large diameter, causing problems such as a higher cost and a higher tendency of noise propagation to the outside of the case. In order to reduce the overall size of the drive device while implementing low cost and low noise, it has not been appropriate to position the planetary gear units and the output member so that they axially overlap each other.

In the vehicle drive device described in Japanese Patent Application Publication No. JP-A-H6-328950, on the other hand, the planetary gear unit and the rotating electrical machine are positioned so as to axially overlap each other in order to reduce the axial dimension. Therefore, the above problems can be suppressed. However, various members in addition to a rotor of the rotating electrical machine are connected to each rotating element of the planetary gear unit. These members physically hinder a rotor shaft of the rotating electrical machine from being rotatably supported by the case on both axial sides. Accordingly, the axial center accuracy of the rotor shaft of the rotating electrical machine can be sacrificed. This point is not specifically considered in Japanese Patent Application Publication No. JP-A-H6-328950, and there has been room for improvement in the support structure of the rotor shaft for maintaining high axial center accuracy.

The present invention was made in view of the above problems, and it is an object of the present invention to reduce the overall size of a drive device while maintaining high axial center accuracy of a rotor shaft. The present invention can also achieve various other advantages.

According to an exemplary aspect of the invention, a drive device includes a rotating electrical machine; a planetary gear unit positioned radially inside the rotating electrical machine so as to axially overlap the rotating electrical machine; a through shaft extending radially inside and through a sun gear of the planetary gear unit; and a case that accommodates the rotating electrical machine and the planetary gear unit. The through shaft is supported by the case on both axial sides of the planetary gear unit, and a rotor of the rotating electrical machine is connected integrally with the sun gear and is rotatably supported at two axial positions, the rotor is supported at a first axial position of the two axial positions by the case, and the rotor is supported at a second axial position of the two axial positions at a position radially inside the sun gear by the through shaft.

BRIEF DESCRIPTION OF THE DRAWINGS

Various exemplary aspects of the present invention will be described with reference to the drawings, wherein.

DETAILED DESCRIPTION OF EMBODIMENTS

1. First Embodiment

Figure 1:
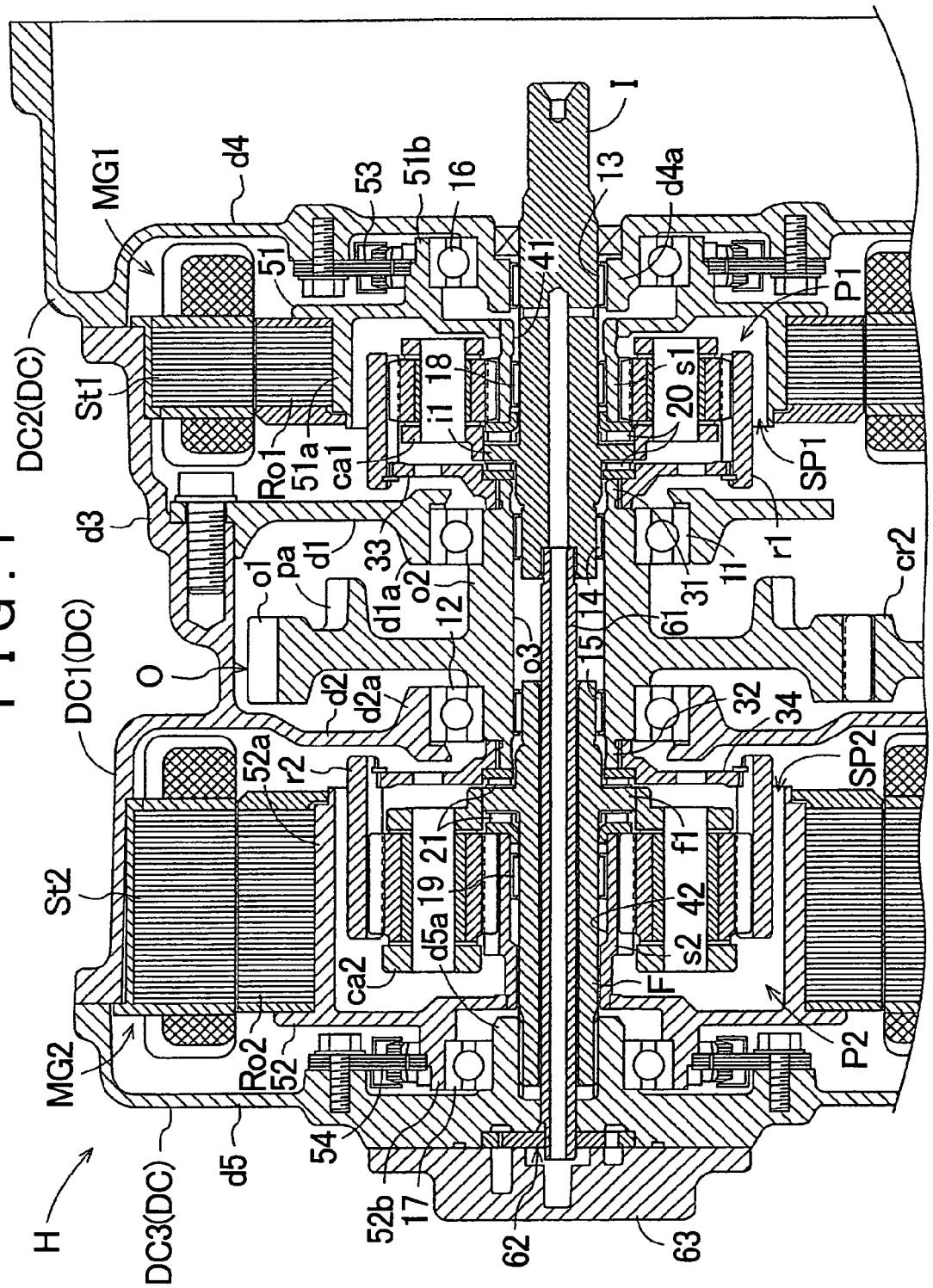
FIG. 1 is a cross-sectional view of a main part of a hybrid drive device according to a first embodiment of the present invention.
Figure 2:
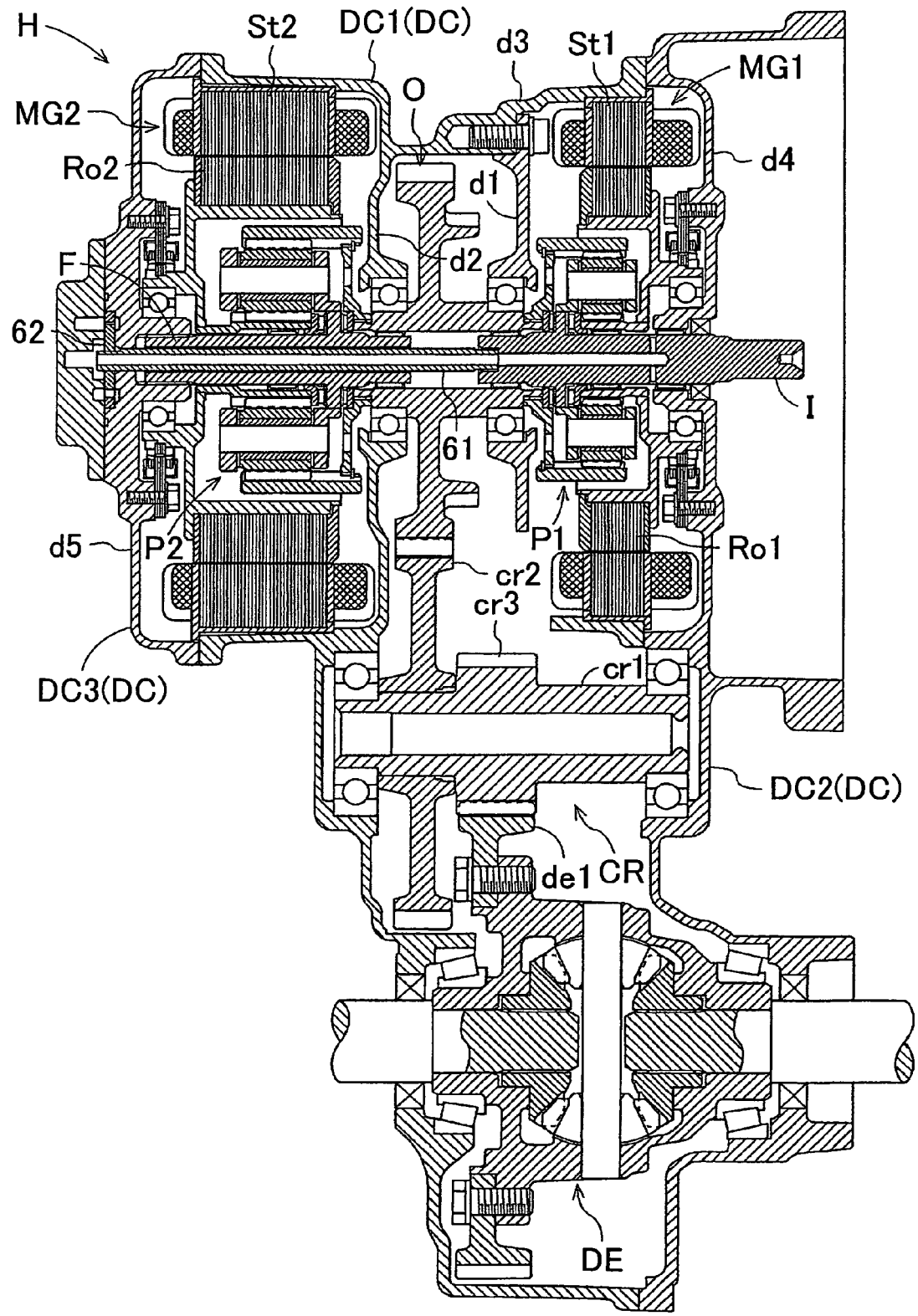
FIG. 2 is an overall cross-sectional view of the hybrid drive device according to the first embodiment of the present invention.

First, a hybrid drive device H according to a first embodiment of the present invention will be described with reference to the accompanying drawings. The hybrid drive device H is a drive device of a hybrid vehicle which uses both an engine and rotating electrical machines as a driving force source of a vehicle. FIG. 1 is a cross-sectional view of a main part of the hybrid drive device H. FIG. 2 is an overall cross-sectional view of the hybrid drive device H. As shown in these figures, the hybrid drive device H includes an input shaft I connected to an engine, a first motor generator MG1, a second motor generator MG2, an output gear O, a first planetary gear unit P1, and a second planetary gear unit P2. The output gear O is positioned on the wheel (not shown) side of the input shaft I, the first motor generator MG1, and the second motor generator MG2 on a power transmission path. The hybrid drive device H forms an electric continuously variable transmission for controlling rotation of the first motor generator MG1 to continuously shift a rotation driving force of the input shaft I through the first planetary gear unit P1 and to transmit the resultant rotation driving force to the output gear O. The second motor generator MG2 is capable of transmitting a rotation driving force to the output gear O through the second planetary gear unit P2. In the present embodiment, the first motor generator MG1 and the second motor generator MG2 correspond to a "rotating electrical machine" in the present invention.

The first motor generator MG1, the second motor generator MG2, the output gear O, the first planetary gear P1, and the second planetary gear P2 are positioned coaxially with the input shaft I, and are accommodated in a case DC as non-rotating members. As shown in FIG. 2, in the present embodiment, the output gear O is drivingly connected to not-shown wheels through a counter speed-reducing mechanism CR and a differential unit DE. The counter speed-reducing mechanism CR and the differential unit DE are positioned in parallel with each other on different axes from the axis of the input shaft I. In other words, the hybrid drive device H has a three-axis structure having the following three axes: a first axis on which the input shaft I, the first motor generator MG1, the second motor generator MG2, the output gear O, the first planetary gear unit P1, and the second planetary gear unit P2 are positioned; a second axis on which the counter speed-reducing mechanism CR is positioned; and a third axis on which the differential unit DE is positioned. The case DC is structured so as to accommodate also the counter speed-reducing mechanism CR and the differential unit DE. In other words, the hybrid drive device H is a drive device of a transaxle structure in which the electric continuously variable transmission and the differential unit DE are integrally accommodated in the case DC. Hereinafter, the structure of each part of the hybrid drive device H will be described in detail.

1-1. Function and Connection Structure of Each Part

First, a function and a connection structure of each part of the hybrid drive device H of the present embodiment will be described. The input shaft I is connected to the engine through a damper. The damper and the engine are not shown in the figures. For example, various kinds of known internal combustion engines such as a gasoline engine and a diesel engine can be used as the engine. Note that it is also preferable that the input shaft I is directly connected to the engine or the input shaft I is connected to the engine through a clutch or the like instead of the damper. The input shaft I is connected so as to rotate integrally with a carrier ca1 of the first planetary gear unit P1.

The output gear O is positioned on the wheel side of the input shaft I, the first motor generator MG1, and the second motor generator MG2 on the power transmission path, and transmits a rotation driving force of the input shaft I, the first motor generator MG1, and the second motor generator MG2 to the wheel side. The output gear O is therefore connected to both a ring gear r1 as an output rotating element of the first planetary gear unit P1 and a ring gear r2 as an output rotating element of the second planetary gear unit P2 so as to rotate integrally with the ring gears r1, r2. As shown in FIG. 2, the output gear O is drivingly connected to the not-shown wheels through the counter speed-reducing mechanism CR and the differential unit DE. More specifically, the output gear O meshes with a counter driven gear cr2 of the counter speed-reducing mechanism CR. The output gear O thus functions as an output member for outputting a rotation driving force transmitted from the input shaft I and the first motor generator MG1 through the first planetary gear unit P1 or transmitted from the second motor generator MG2 through the second planetary gear unit P2 to the wheel side.

The counter speed-reducing mechanism CR includes a counter shaft cr1 positioned in parallel with the input shaft I. The counter speed-reducing mechanism CR further includes the counter driven gear cr2 and a differential drive gear cr3 which rotate integrally with the counter shaft cr1. The differential drive gear cr3 has a smaller diameter than that of the counter driven gear cr2. The differential drive gear cr3 meshes with a differential input gear (differential ring gear) de1 of the differential unit DE. The differential unit DE distributes a rotation driving force of the differential input gear de1 to the right and left wheels. The output gear O and the wheels are drivingly connected to each other by the above connection structure. Note that, in the present embodiment, a parking gear pa is integrally provided on the output gear O.

As shown in FIGS. 1 and 2, the first motor generator MG1 has a first stator St1 fixed to the case DC, and a first rotor Ro1 rotatably supported radially inside the first stator St1. The first rotor Ro1 is connected so as to rotate integrally with a sun gear s1 of the first planetary gear unit P1. The second motor generator MG2 has a second stator St2 fixed to the case DC, and a second rotor Ro2 rotatably supported radially inside the second stator St2. The second rotor Ro2 is connected so as to rotate integrally with a sun gear s2 of the second planetary gear unit P2. Each of the first motor generator MG1 and the second motor generator MG2 is electrically connected to an electric power accumulator such as a battery or a capacitor through a not-shown respective inverter. The first motor generator MG1 and the second motor generator MG2 are capable of functioning as a motor (electric motor) for receiving electric power to generate drive power and a generator (electric generator) for receiving drive power to generate electric power.

In this example, the first motor generator MG1 functions mainly as a generator for generating electric power by a rotation driving force of the input shaft I (engine) received through the first planetary gear unit P1 to charge the electric power accumulator or to supply electric power for driving the second motor generator MG2. When a vehicle is running at a high speed, when the engine is started, or the like, however, the first motor generator MG1 may function as a motor for performing power-running to output a driving force. The second motor generator MG2, on the other hand, mainly functions as a motor for assisting a driving force for running a vehicle. When a vehicle is decelerating, or the like, however, the second motor generator MG2 functions as a generator and may function as a generator for regenerating an inertial force of a vehicle as electric energy.

The first planetary gear unit P1 is formed by a single-pinion type planetary gear mechanism. More specifically, the first planetary gear unit P1 has the carrier ca1, the sun gear s1, and the ring gear r1 as rotating elements. The carrier ca1 supports a plurality of pinion gears, and the sun gear s1 and the ring gear r1 mesh with the pinion gears. The sun gear s1 is connected so as to rotate integrally with the first rotor Ro1 of the first motor generator MG1. The carrier ca1 is connected so as to rotate integrally with the input shaft I. The ring gear r1 is connected so as to rotate integrally with the output gear O. The ring gear r1 is therefore connected so as to rotate integrally also with the ring gear r2 of the second planetary gear unit P2 through the output gear O.

Like the first planetary gear unit P1, the second planetary gear unit P2 is formed by a single-pinion type planetary gear mechanism. More specifically, the second planetary gear unit P2 has a carrier ca2, the sun gear s2, and the ring gear r2 as rotating elements. The carrier ca2 supports a plurality of pinion gears, and the sun gear s2 and the ring gear r2 mesh with the pinion gears. The sun gear s2 is connected so as to rotate integrally with the second rotor Ro2 of the second motor generator MG2. The carrier ca2 is connected to the case DC as a non-rotating member, and is fixed so as not to rotate. The ring gear r2 is connected so as to rotate integrally with the output gear O.

Figure 3:
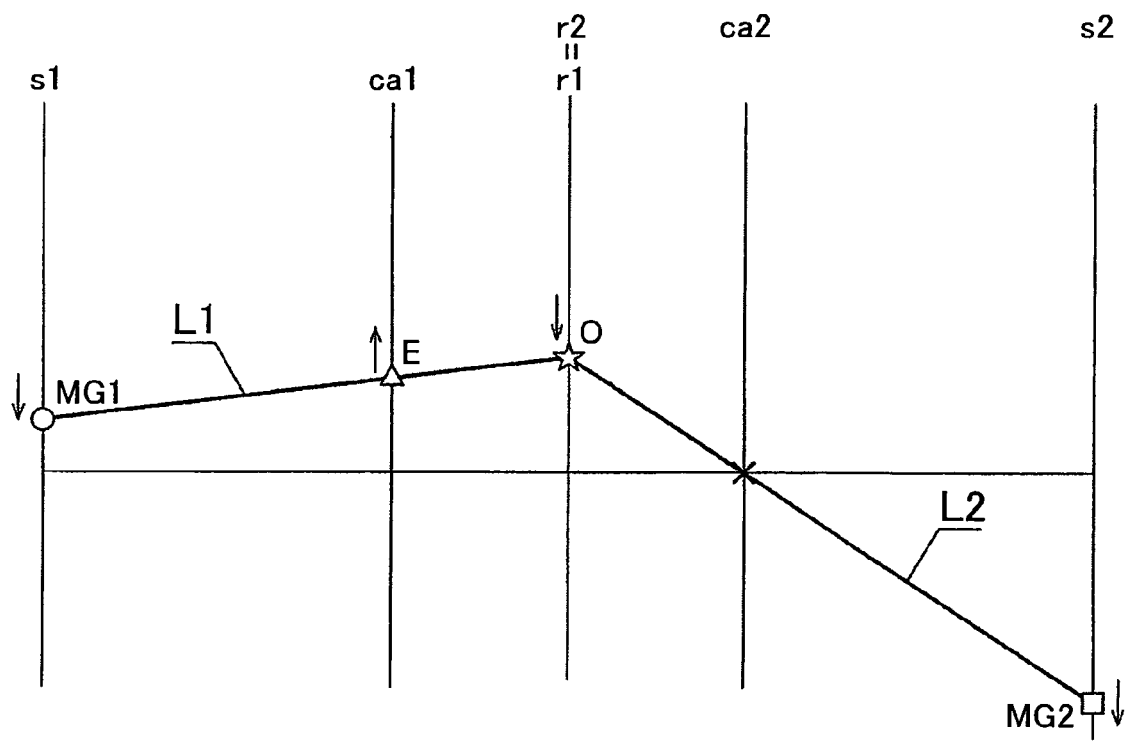
FIG. 3 is a velocity diagram showing an operation state of a first planetary gear unit and a second planetary gear unit in the hybrid drive device according to the first embodiment of the present invention.

FIG. 3 is a velocity diagram showing an operation state of the first planetary gear unit P1 and the second planetary gear unit P2 when the vehicle is running. In this velocity diagram, the ordinate corresponds to the rotational speed of each rotating element, and points on the abscissa indicate that the rotational speed is zero, the region above the abscissa indicates a positive rotational speed, and the region under the abscissa indicates a negative rotational speed. A plurality of parallel vertical lines respectively correspond to the rotating elements of the first planetary gear unit P1 and the second planetary gear unit P2. In other words, "s1," "ca1," and "r1" shown above each vertical line in FIG. 3 respectively correspond to the sun gear s1, the carrier ca1, and the ring gear r1 of the first planetary gear unit P1, and "s2," "ca2," and "r2" respectively correspond to the sun gear s2, the carrier ca2, and the ring gear r2 of the second planetary gear unit P2. In FIG. 3, the distances between the vertical lines corresponding to the rotating elements respectively correspond to the gear ratios of the first planetary gear unit P1 and the second planetary gear unit P2 (the gear ratio of the sun gear to the ring gear=[the number of teeth of the sun gear]/[the number of teeth of the ring gear]). In this velocity diagram, "white triangle" indicates the rotational speed of the input shaft I (engine), "white star" indicates the rotational speed of the output gear O, "white circle" indicates the rotational speed of the first motor generator MG1, "white square" indicates the rotational speed of the second motor generator MG2, and "x" indicates a fixed state to the case DC as a non-rotating member. Note that the arrows shown next to these symbols indicate an example of the direction of a torque which is transmitted to each rotating element.

As shown by a straight line L1 in FIG. 3, the first planetary gear unit P1 functions to distribute a rotation driving force of the input shaft I (engine) to the output gear O and the first motor generator MG1. In other words, in the first planetary gear unit P1, the carrier ca1 located at an intermediate position in the order of the rotational speed rotates integrally with the input shaft I (engine). The rotation of the carrier ca1 is distributed to the sun gear s1 located at one end in the order of the rotational speed in the first planetary gear unit P1, and to the ring gear r1 located at the other end in the order of the rotational speed in the first planetary gear unit P1. The rotation distributed to the ring gear r1 is transmitted to the output gear O, and the rotation distributed to the sun gear s1 is transmitted to the first rotor Ro1 of the first motor generator MG1 (see FIG. 1). In this case, the engine outputs a torque of a positive direction according to a requested driving force from the vehicle, while being controlled so as to maintain a high efficiency, low exhaust gas state (generally conforming to optimal fuel consumption characteristics). This torque is transmitted through the input shaft I to the carrier ca1. The first motor generator MG1, on the other hand, transmits the reaction force of the torque of the first shaft I to the sun gear s1 by outputting a torque of a negative direction. In other words, the first motor generator MG1 functions as a reaction force receiver for supporting the reaction force of the torque of the input shaft I. The torque of the input shaft I is thus distributed to the output gear O. In this case, the rotational speed of the output gear O is determined by the rotational speed of the first motor generator MG1. In a normal running state, the first motor generator MG1 generates electric power by generating a torque of a negative direction while rotating positively (i.e., the rotational speed is positive). As the vehicle speed becomes higher (i.e., as the rotational speed of the output gear O becomes higher), on the other hand, the first motor generator MG1 may perform power-running by generating a torque of a negative direction while rotating negatively (i.e., the rotational speed is negative).

As shown by a straight line L2 in FIG. 3, the second planetary gear unit P2 functions to reduce the rotational speed of the second motor generator MG2 to transmit the resultant rotation of the output gear O. The rotation driving force of the second motor generator MG2 is therefore amplified and transmitted to the output gear O. As described above, in the second planetary gear unit P2, the carrier ca located at an intermediate position in the order of the rotational speed in the second planetary gear unit P2 is fixed to the case DC, and the rotational speed of the carrier ca2 is zero. In this case, the rotational speed of the sun gear s2 located at one end in the order of the rotational speed is reduced according to the gear ratio of the second planetary gear unit P2, and then transmitted to the ring gear r2 located at the other end in the order of the rotational speed. The second planetary gear unit P2 thus reduces the rotational speed of the second motor generator MG2 connected to the sun gear s2, and transmits the resultant rotation to the output gear O connected to the ring gear r2. The second motor generator MG2 outputs a torque of a positive direction or a negative direction as appropriate so as to assist the driving force distributed from the first planetary gear unit P1 to the output gear O according to the requested driving force from the vehicle, the running state of the vehicle, and the like.

1-2. Detailed Structure of Each Part

Hereinafter, a detailed structure of each part of the hybrid drive device H according to the present embodiment will be described with reference mainly to FIG. 1. As described above, in the hybrid drive device H, the first motor generator MG1, the second motor generator MG2, the output gear O, the first planetary gear unit P1, and the second planetary gear unit P2 are positioned coaxially with the input shaft I. The first planetary gear unit P1 is positioned radially inside the first motor generator MG1 so as to axially overlap the first motor generator MG1. The second planetary gear unit P2 is positioned radially inside the second motor generator MG2 so as to axially overlap the second motor generator MG2. These components are positioned in the following order from the engine connected to the input shaft I (i.e., from the right side in FIG. 1): the first motor generator MG1 and the first planetary gear unit P1, the output gear O, and the second motor generator MG2 and the second planetary gear unit P2. Hereinafter, the position, the shape, the shaft support structure, and the like of each part will be described in detail sequentially.

1-2-1. Case

This hybrid drive device H has the case DC which accommodates the first motor generator MG1, the second motor generator MG2, the first planetary gear unit P1, the second planetary gear unit P2, and the output gear O. As described above, in the present embodiment, the case DC is structured so as to further accommodate the counter speed-reducing mechanism CR and the differential unit DE together with the above components. The case DC includes a case peripheral wall d3, a first end support wall d4, and a second end support wall d5. The case peripheral wall d3 covers the outer periphery of each component accommodated in the case DC. The first end support wall d4 covers an opening at one axial end of the case peripheral wall d3. The second end support wall d5 covers an opening at the other axial end of the case peripheral wall d3. The first end support wall d4 is positioned on one axial side (the right side in FIG. 1) of the first motor generator MG1. The second end support wall d5 is positioned on the other axial side (the left side in FIG. 1) of the second motor generator MG2. The case DC further includes a first intermediate support wall d1 and a second intermediate support wall d2. The first intermediate support wall d1 is positioned between the output gear O and the first planetary gear unit P1 in the axial direction. The second intermediate support wall d2 is positioned between the output gear O and the second planetary gear unit P2 in the axial direction.

In the present embodiment, the case DC is dividable into a main case DC1, a first cover DC2 which is attached to one axial side of the main case DC1, and a second cover DC3 which is attached to the other axial side of the main case DC1. The main case DC1 has the case peripheral wall d3 and accommodates main components of the hybrid drive device H. In the illustrated example, the second intermediate support wall d2 is formed integrally with the main case DC1 (case DC). The first intermediate support wall d1, on the other hand, is formed by a separate part from the main case DC1 (case DC). The first intermediate support wall d1 abuts on a stepped portion of the inner peripheral surface of the main case DC1 from one axial side of the main case DC1, and is thus attached integrally with the main case DC1. The main case DC1 is opened at its both axial ends, and each component to be accommodated in the case DC is inserted into the main case DC1 through these openings and assembled therein. In this example, the output gear O, the first intermediate support wall d1, the first planetary gear unit P1, and the first motor generator MG1 are sequentially inserted into the main case DC1 from one axial side of the main case DC1 and assembled therein. The second planetary gear unit P2 and the second motor generator MG2 are sequentially inserted into the main case DC1 from the other axial side of the main case DC1 and assembled therein.

After these components are thus accommodated, the first cover DC2 is attached to one axial side of the main case DC1, and the second cover DC3 is attached to the other axial side of the main case DC1. The first cover DC2 has the first end support wall d4, and the second cover DC3 has the second end support wall d5. The first cover DC2, the second cover DC3, and the first intermediate support wall d1 are attached to the main case DC1 with, for example, fastening members such as bolts. Note that the shape and the structure of the first end support wall d4, the second end support wall d5, the first intermediate support wall d1, and the second intermediate support wall d2 will be described in detail below.

1-2-2. Output Gear

The output gear O is positioned between the first planetary gear unit P1 and the second planetary gear unit P2 in the axial direction without axially overlapping the first planetary gear unit P1 and the second planetary gear unit P2. The output gear O is positioned coaxially with the first planetary gear unit P1 (and the first motor generator MG1) and the second planetary gear unit P2 (and the second motor generator MG2). The output gear O includes an output gear main body o1 and an extended shaft portion o2. The output gear main body o1 meshes with the counter driven gear cr2 of the counter speed-reducing mechanism CR. The extended shaft portion o2 is axially extended on both sides of the output gear main body o1, and has a smaller diameter than that of the output gear main body o1. The output gear main body o1 and the extended shaft portion o2 are formed by one part. The output gear main body o1 is formed as a gear having a relatively large diameter, and has a larger outer diameter than the respective outer diameters of the first planetary gear unit P1 and the second planetary gear unit P2. In the illustrated example, the output gear main body o1 has substantially the same diameter as that of the first rotor Ro1 of the first motor generator GM1 and the second rotor Ro2 of the second motor generator MG2. The output gear main body o1 has a rim portion and a web portion. The outer peripheral surface of the rim portion is a tooth surface, and the web portion has a smaller width than that of the rim portion. In the illustrated example, the parking gear pa is formed so as to axially protrude from a side surface of the web portion.

The extended shaft portion o2 is formed as a cylindrical shaft portion having a relatively small diameter, and has a smaller outer diameter than the respective outer diameters of the first planetary gear unit P1 and the second planetary gear unit P2. In this example, the outer peripheral surface of the extended shaft portion o2 is stepped so that the diameter of the extended shaft portion o2 is reduced in two steps toward both axial ends. The output gear main body o1 is connected to an axial middle part of the extended shaft portion o2 which has the largest diameter in the outer peripheral surface of the extended shaft portion o2. Output bearings 11, 12 are respectively externally fitted to intermediate parts of the extended shaft portion o2 which are located on both side of the axial middle part and which have an intermediate diameter. Connecting portions 31, 32 are respectively formed in small-diameter parts of the extended shaft portion o2 which are located at both ends of the extended shaft portion o2. The connecting portions 31, 32 are respectively connected to the ring gear r1 of the first planetary gear unit P1 and the ring gear r2 of the second planetary gear unit P2. The extended shaft portion o2 is rotatably supported by the case DC through the output bearings 11, 12. The extended shaft portion o2 has a through hole in its axial center. This through hole is a shaft insertion hole o3 in which the input shaft I and a fixed shaft F are inserted. As described later, one end of the input shaft I and one end of the fixed shaft F are rotatably supported in the shaft insertion hole o3. Note that the fixed shaft F is provided as a non-rotating member fixed to the case DC, and is connected to the carrier ca2 of the second planetary gear unit P2.

The output gear O is rotatably supported by the pair of output bearings 11, 12. The pair of output bearings 11, 12 are located on the output gear O side of the first planetary gear unit P1 and the second planetary gear unit P2, and support the output gear O from both axial sides. The pair of output bearings 11, 12 are thus respectively positioned between the output gear main body o1 and the first planetary gear unit P1 and between output gear main body o1 and the second planetary gear unit P2 in the axial direction. As described above, the extended shaft portion o2 located on both axial sides of the output gear main body o1 are rotatably supported by the case DC through the output bearings 11, 12. In the present embodiment, the pair of output bearings 11, 12 are provided so as to support the outer peripheral surface of the extended shaft portion o2. The output gear O is thus rotatably supported by the case DC through the output bearings 11, 12 which are supported by the case DC at a position radially outside the shaft insertion hole o3 formed in the axial center. The pair of output bearings 11, 12 are positioned so as to radially overlap the first planetary gear unit P1 and the second planetary gear unit P2. The pair of output bearings 11, 12 are positioned coaxially with the first planetary gear unit P1 and the second planetary gear unit P2. The pair of output bearings 11, 12 can be positioned so as to radially overlap the first planetary gear unit P1 and the second planetary gear unit P2 by making the respective inner diameters of the output bearings 11, 12 smaller than the respective outer diameters of the first planetary gear unit P1 and the second planetary gear unit P2. In the illustrated example, the respective outer diameters of the pair of output bearings 11, 12 are made smaller than those of the first planetary gear unit P1 and the second planetary gear unit P2. The pair of output gears 11, 12 are thus positioned so as to completely radially overlap the first planetary gear unit P1 and the second planetary gear unit P2. Note that, in the illustrated example, ball bearings capable of supporting a relatively large load are used as the output bearings 11, 12.

As described above, the case DC has the first intermediate support wall d1 positioned between the output gear O and the first planetary gear unit P1 in the axial direction, and the second intermediate support wall d2 positioned between the output gear O and the second planetary gear unit P2 in the axial direction. The pair of output bearings 11, 12 are respectively supported by the first intermediate support wall d1 and the second intermediate support wall d2. In other words, the first output bearing 11 located on one axial side (on the first motor generator MG1 side; the right side in FIG. 1; the same applies to the following description) is supported by the first intermediate support wall d1. The second output bearing 12 located on the other axial side (on the second motor generator MG2 side; the left side in FIG. 1; the same applies to the following description) is supported by the second intermediate support wall d2. The output gear O is thus rotatably supported on its both axial sides by the first intermediate support wall d1 and the second intermediate support wall d2 through the output bearings 11, 12. The first intermediate support wall d1 includes a boss-shaped (cylindrical) axially protruding portion d1*a* around (the extended shaft portion o2 of) the output gear O. The axially protruding portion d1*a* axially protrudes toward the output gear O, and the first output bearing 11 is supported radially inside the axially protruding portion d1*a*. Similarly, the second intermediate support wall d2 includes a boss-shaped (cylindrical) axially protruding portion d2*a* around (the extended shaft portion o2 of) the output gear O. The axially protruding portion d2*a* axially protrudes toward the output gear O, and the second output bearing 12 is supported radially inside the axially protruding portion d2*a*. In the illustrated example, the second output bearing 12 is positioned so as to axially overlap the tooth surface of the output gear O. In other words, the second output bearing 12 and the axially protruding portion d2*a* of the second intermediate support wall d2 supporting the second output bearing 12 are positioned so as to axially overlap the rim portion of the output gear main body o1 whose outer peripheral surface is a tooth surface.

The output gear O is formed by a separate part from the ring gear r1 of the first planetary gear unit P1 and the ring gear r2 of the second planetary gear unit P2. On one axial side of the output gear O, the output gear O is connected so as to rotate integrally with the ring gear r1 of the first planetary gear unit P1 through the first connecting portion 31. On the other axial side of the output gear O, the output gear O is connected so as to rotate integrally with the ring gear r2 of the second planetary gear unit P2 through the second connecting portion 32. In the present embodiment, the ring gear r1 of the first planetary gear unit P1 is connected to the first connecting portion 31 through a first output connecting member 33, and the ring gear r2 of the second planetary gear unit P2 is connected to the second connecting portion 32 through a second output connecting member 34. The first output connecting member 33 is a member provided so as to extend radially inward from the ring gear r1 of the first planetary gear unit P1. In the present embodiment, the first output connecting member 33 is a disc-shaped member positioned along the radial direction and having a boss portion formed in its radial center. The first output connecting member 33 is positioned adjacent to the second planetary gear unit P2 side (the other axial side) of the first planetary gear unit P1. The other axial end of the ring gear r1 is connected to a radial outer end of the first output connecting member 33, and the output gear O is connected to a radial inner end of the first output connecting member 33 through the first connecting portion 31. The second output connecting member 34 is a member provided so as to extend radially inward from the ring gear r2 of the second planetary gear unit P2. In the present embodiment, the second output connecting member 34 is a disc-shaped member positioned along the radial direction and having a boss portion formed in its radial center. The second output connecting member 34 is positioned adjacent to the first planetary gear unit P1 side (one axial side) of the second planetary gear unit P2. One axial end of the ring gear r2 is connected to a radial outer end of the second output connecting member 34, and the output gear O is connected to a radial inner end of the second output connecting member 34 through the second connecting portion 32.

The first connecting portion 31 and the second connecting portion 32 may have any structure as long as the first connecting portion 31 and the second connecting portion 32 are capable of engaging the output gear O with the ring gear r1 of the first planetary gear unit P1 and the ring gear r2 of the second planetary gear unit P2 at least in the direction around the shaft (rotation direction). Various known connecting structures can be used for the first connecting portion 31 and the second connecting portion 32. In the present embodiment, the first connecting portion 31 and the second connecting portion 32 are spline engagement portions for connecting the output gear O and the ring gear r1 of the first planetary gear unit P1 and connecting the output gear O and the ring gear r2 of the second planetary gear unit P2 by spline engagement. In this example, the first connecting portion 31 is provided at one end of the extended shaft portion o2 which is located on one axial side of the output gear main body o1. The second connecting portion 32 is provided at the other end of the extended shaft portion o2 which is located on the other axial side of the output gear main body o1. More specifically, spline engagement grooves which form the first connecting portion 31 and the second connecting portion 32 are formed on the outer peripheral surface of the small-diameter portions located on both axial ends of the extended shaft portion o2 of the output gear O. Similarly, spline engagement grooves which form the first connecting portion 31 and the second connecting portion 32 are formed on the inner peripheral surface of the boss portion of the first output connecting member 33 extending radially inward from the ring gear r1 of the first planetary gear unit P1, and on the inner peripheral surface of the boss portion of the second output connecting member 34 extending radially inward from the ring gear r2 of the second planetary gear unit P2. By engagement of the spline engagement grooves, the ring gear r1 of the first planetary gear unit P1 and the ring gear r2 of the second planetary gear unit P2 are respectively connected to both axial ends of the extended shaft portion o2 of the output gear O so as to rotate integrally.

The first connecting portion 31 is positioned on the first planetary gear unit P1 side of the first output bearing 11 located on the first planetary gear unit P1 side of the output gear O. Accordingly, the first output connecting member 33 and the ring gear r1 of the first planetary gear unit P1 can be connected to the output gear O from the first planetary gear unit P1 side of the first intermediate support wall d1 and the first output bearing 11. Similarly, the second connecting portion 32 is positioned on the second planetary gear unit P2 side of the second output bearing 12 located on the second planetary gear unit P2 side of the output gear O. Accordingly, the second output connecting member 34 and the ring gear r2 of the second planetary gear unit P2 can be connected to the output gear O from the second planetary gear unit P2 side of the second intermediate support wall d2 and the second output bearing 12.

In the hybrid drive device H of the present embodiment, with the output gear O being supported by the case DC, the first planetary gear unit P1 and the first motor generator MG1 are assembled to the first connecting portion 31 from one axial side, and the second planetary gear unit P2 and the second motor generator GM2 are assembled to the second connecting portion 32 from the other axial side. In this example, one axial side of the extended shaft portion o2 of the output gear O is supported by the first intermediate support wall d1 through the first output bearing 11, and the other axial side of the extended shaft portion o2 is supported by the second intermediate support wall d2 through the second output bearing 12. The output gear O is thus supported by the case DC. In this state, the first connecting portion 31 of the extended shaft portion o3 is positioned so as to protrude to the first planetary gear unit P1 side of the first output bearing 11 supported by the first intermediate support wall d1. The second connecting portion 32 is positioned so as to protrude to the second planetary gear unit P2 side of the second output bearing 12 supported by the second intermediate support wall d2.

The first planetary gear unit P1 and the first motor generator MG1, and the second planetary gear unit P2 and the second motor generator MG2 are thus respectively assembled to the first connecting portion 31 and the second connecting portion 32 from both axial sides. This will be described in details. The ring gear r1 of the first planetary gear unit P1 is first connected to the first connecting portion 31 from one axial side. More specifically, the spline engagement grooves of the first output connecting member 33 connected to the ring gear r1 are engaged and connected with the spline engagement grooves of the first connecting portion 31 of the output gear O protruding to the first planetary gear unit P1 side of the first output bearing 11. A first subunit is then assembled to the ring gear r1 of the first planetary gear unit P1 from one axial side. The first subunit is a subunit formed in advance by assembling the carrier ca1 and the sun gear s1 of the first planetary gear unit P1 and the first rotor Ro1 of the first motor generator MG1 connected to the sun gear s1. Similarly, the ring gear r2 of the second planetary gear unit P2 is connected to the second connecting portion 32 from the other axial side. More specifically, the spline engagement grooves of the second output connecting member 34 connected to the ring gear r2 are engaged and connected with the spline engagement grooves of the second connecting portion 32 of the output gear O protruding to the second planetary gear unit P2 side of the second output bearing 12. A second subunit is then assembled to the ring gear r2 of the second planetary gear unit P2 from the other axial side. The second subunit is a subunit formed in advance by assembling the carrier ca2 and the sun gear s2 of the second planetary gear unit P2 and the second rotor Ro2 of the second motor generator MG2 connected to the sun gear s2.

The first connecting portion 31 is thus positioned on the first planetary gear unit P1 side of the first output bearing 11, and the second connecting portion 32 is positioned on the second planetary gear unit P2 side of the second output bearing 12. In this way, the subunits can be assembled from both sides of the output gear O to the output gear O supported by the case DC. Accordingly, the manufacturing process of the hybrid drive device H of the present embodiment can be simplified.

1-2-3. Input Shaft and Fixed Shaft

The input shaft I is a shaft for transmitting a rotation driving force of the engine to the carrier ca1. The input shaft I is connected to the engine at its one axial end, and is connected to the carrier ca1 of the first planetary gear unit P1 at the other axial end. The input shaft I extends through the first end support wall d4 and is inserted into the case DC. The first end support wall d4 is an end wall located on one axial side of the case DC. The input shaft I is a through shaft extending through radially inside the sun gear s1 of the first planetary gear unit P1. In other words, the input shaft I extends through a first sun-gear through hole 41 formed in the axial center of the sun gear s1, and is supported by the case DC on both axial sides of the first planetary gear unit P1. In this example, on one axial side of the first planetary gear unit P1, the input shaft I is supported by the case DC so as to be rotatable through a first input bearing 13. On the other axial side of the first planetary gear unit P1, the input shaft I is supported by the case DC so as to be rotatable through a second input bearing 14. In the illustrated example, needle bearings capable of reducing the radial thickness to a relatively small value are used as the first input bearing 13 and the second input bearing 14.

In the present embodiment, the case DC includes the first end support wall d4 positioned on one axial side of the first motor generator MG1. The first input bearing 13 is supported by the first end support wall d4. The first end support wall d4 includes a boss-shaped (cylindrical) axially protruding portion d4a around the input shaft I. The axially protruding portion d4a axially protrudes toward the first motor generator MG1, and the first input bearing 13 is supported radially inside the axially protruding portion d4a. The input shaft I is rotatably supported by the first end support wall d4 through the first input bearing 13. More specifically, the input shaft I is supported by the first end support wall d4 of the case DC through the first input bearing 13 provided between the inner peripheral surface of the axially protruding portion d4a of the first end support wall d4 and the outer peripheral surface of the input shaft I.

One end of the input shaft I, that is, the other axial end of the input shaft I in this example, is supported by the case DC through the output gear O. More specifically, the other axial end of the input shaft I is inserted into the shaft insertion hole o3 formed in the axial center of the output gear O, and is rotatably supported by the inner peripheral surface of the shaft insertion hole o3 through the second input bearing 14. The second input bearing 14 is positioned between the inner peripheral surface of the shaft insertion hole o3 and the outer peripheral surface of the input shaft I. As described above, the shaft insertion hole o3 of the output gear O is formed in the axial center of the extended shaft portion o2, and the outer peripheral surface of the extended shaft portion o2 is rotatably supported by the first intermediate support wall d1 or the second intermediate support wall d2 of the case DC through the output bearings 11, 12, respectively. As shown in the figures, the first output bearing 11 supporting one axial side of the extended shaft portion o2 is positioned radially outside the second input bearing 14 so as to axially overlap the second input bearing 14. The other axial end of the input shaft I is thus rotatably supported by the first intermediate support wall d1 of the case DC through the second input bearing 14, the extended shaft portion o2 of the output gear O, and the first output bearing 11.

The fixed shaft F is a shaft as a non-rotating member for fixing the carrier ca2 of the second planetary gear unit P2 to the case DC. One axial end of the fixed shaft F is connected to the carrier ca2 of the second planetary gear unit P2, and the other axial end of the fixed shaft F is connected to the case DC. The fixed shaft F is a through shaft extending through radially inside the sun gear s2 of the second planetary gear unit P2. In other words, the fixed shaft F extends through a second sun-gear through hole 42 formed in an axial center of the sun gear s2, and is supported by the case DC on both axial sides of the second planetary gear unit P2. In the present embodiment, the fixed shaft F is non-rotatably supported by the case DC on the other axial side of the second planetary gear unit P2. On one axial side of the second planetary gear unit P2, the fixed shaft F is supported by the case DC through a fixed bearing 15 so as to be rotatable relative to the output gear O. In the illustrated example, a needle bearing capable of reducing the radial thickness to a relatively small value is used as the fixed bearing 15.

In the present embodiment, the case DC includes the second end support wall d5 positioned on the other axial side of the second motor generator MG2. The fixed shaft F is directly supported by the second end support wall d5. In this example, the fixed shaft F and the second end support wall d5 are connected by spline engagement portions. More specifically, the second end support wall d5 has a boss-shaped (cylindrical) axially protruding portion d5a around the fixed shaft F. The axially protruding portion d5a axially protrudes toward the second motor generator MG2, and spline engagement grooves are formed on the inner peripheral surface of the axially protruding portion d5a. Spline engagement grooves are formed also on the outer peripheral surface of the other axial end of the fixed shaft F. By engagement of the spline engagement grooves, the fixed shaft F is fixedly supported by the second end support wall d5 in a non-rotatable state.

One end of the fixed shaft F, that is, one axial end of the fixed shaft F in this example, is supported by the case DC through the output gear O. More specifically, one axial end of the fixed shaft F is inserted into the shaft insertion hole o3 formed in the axial center of the output gear O, and is rotatably supported by the inner peripheral surface of the shaft insertion hole o3 through the fixed bearing 15. The fixed bearing 15 is positioned between the inner peripheral surface of the shaft insertion hole o3 and the outer peripheral surface of the fixed shaft F. As described above, the shaft insertion hole o3 of the output gear O is formed in the axial center of the extended shaft portion o2, and the outer peripheral surface of the extended shaft portion o2 is rotatably supported by the first intermediate support wall d1 or the second intermediate support wall d2 of the case DC through the output bearings 11, 12, respectively. As shown in the figures, the second output bearing 12 supporting the other axial side of the extended shaft portion o2 is positioned radially outside the fixed bearing 15 so as to axially overlap the fixed bearing 15. One axial end of the fixed shaft F is thus rotatably supported by the second intermediate support wall d2 of the case DC through the fixed bearing 15, the extended shaft portion o2 of the output gear O, and the second output bearing 12.

As described above, in the present embodiment, the input shaft I as a through shaft is directly supported by the case DC through a bearing on one axial side of the first planetary gear unit P1. The input shaft I is indirectly supported by the case DC through a bearing and the extended shaft portion o2 of the output gear O on the other axial side of the first planetary gear unit P1. The fixed shaft F as a through shaft, on the other hand, is directly supported by the case DC with no bearing on the other axial side (on one axial side in the present invention) of the second planetary gear unit P2. The fixed shaft F is indirectly supported by the case DC through a bearing and the extended shaft portion o2 of the output gear O on one axial side of the second planetary gear unit P2. The state in which the input shaft I or the fixed shaft F is directly supported by the case DC means the state in which the input shaft I or the fixed shaft F is supported so as to be in direct contact with the case DC, or is supported by the case DC only through a bearing. On the other hand, the state in which the input shaft I or the fixed shaft F is indirectly supported by the case DC means the state in which the input shaft I or the fixed shaft F is supported by the case DC with a member other than a bearing (in this example, the extended shaft portion o2 of the output gear O) interposed therebetween. Note that, in the present embodiment, the first input bearing 13, the second input bearing 14, and the fixed bearing 15 which respectively support the input shaft I and the fixed shaft F as through shafts correspond to a through bearing in the present invention.

In the present embodiment, a pump driving shaft 61 is connected to the other axial end of the input shaft I. The pump driving shaft 61 is connected to the input shaft I at its one axial end. The pump driving shaft 61 extends through a through hole formed in the axial center of the fixed shaft F. The pump driving shaft 61 is connected to a rotor of an oil pump 62 at the other axial end. The oil pump 62 is provided on the second end support wall d5 of the case DC. A flow path is formed so as to extend through the axial center of the pump driving shaft 61 in the axial direction, so that oil discharged from the oil pump 62 flows therethrough. The oil pump 62 has a pump chamber formed between the other axial side surface (outer side surface) of the second end support wall d5 and a pump cover 63 attached so as to face the side surface. A rotor is provided in the pump chamber.

1-2-4. Motor Generator

The first motor generator MG1 is positioned on one axial side of the output gear O, and is positioned radially outside the first planetary gear unit P1 which is also positioned on one axial side of the output gear O. The first stator St1 of the first motor generator MG1 is fixed to the inner peripheral surface of the case peripheral wall d3 of the case DC. The first rotor Ro1 is connected integrally with the sun gear s1 of the first planetary gear unit P1 through a first rotor connecting member 51. The first rotor Ro1 is supported radially outside the first planetary gear unit P1 by the first rotor connecting member 51.

The first rotor connecting member 51 is a member provided so as to extend radially inward from the first rotor Ro1. In the present embodiment, the first rotor connecting member 51 is a disc-shaped member positioned along the radial direction and having a circular hole formed in its radial center. The first rotor connecting member 51 is positioned adjacent to the opposite side of the first planetary gear unit P1 to the second planetary gear unit P2 (one axial side; the right side in FIG. 1). The first rotor Ro1 is fixed to the radial outer end of the first rotor connecting member 51, and the sun gear s1 of the first planetary gear unit P1 is fixed to the radial inner end of the first rotor connecting member 51. The first rotor connecting member 51 is fixed to one axial end of the first rotor Ro1 and to one axial end of the sun gear s1. In the present embodiment, the first rotor connecting member 51 is shaped so as to integrally include a cylindrical portion 51a in order to support the inner peripheral surface of the first rotor Ro1. The cylindrical portion 51a axially protrudes from the disc-shaped member. The cylindrical portion 51a is provided so as to protrude toward the first planetary gear unit P1 side (the other axial side; the left side in FIG. 1), and the inner peripheral surface of the first rotor Ro1 is in contact with the outer peripheral surface of the cylindrical portion 51a.

As described above, by fixing the one axial end of the first rotor Ro1 to the radial outer end of the first rotor connecting member 51, a first space SP1 surrounded by the inner peripheral surface of the first rotor Ro1 (in this example, the inner peripheral surface of the cylindrical portion 51a) and the first rotor connecting member 51 is formed radially inside the first rotor Ro1. This first space SP1 is a space which opens toward the second planetary gear unit P2 side (the other axial side). The first planetary gear unit P1 is entirely or partially accommodated in the first space SP1.

The first rotor Ro1 of the first motor generator MG1 is rotatably supported at two axial positions. The first rotor Ro1 is supported by the case DC at one of the two axial positions. At the other axial position, the first rotor Ro1 is supported at a position radially inside the sun gear s1 of the first planetary gear unit P1 by the input shaft I. In the present embodiment, the first rotor Ro1 is rotatably supported by the first end support wall d4 of the case DC through a first rotor bearing 16 in a support portion located on one axial side. The first rotor Ro1 is also rotatably supported at a position radially inside the sun gear s1 by the input shaft I through a third rotor bearing 18 in a support portion located on the other axial side. Note that, in the illustrated example, a ball bearing capable of supporting a relatively large load is used as the first rotor bearing 16. A needle bearing capable of reducing the radial thickness to a relatively small value is used as the third rotor bearing 18.

In the present embodiment, the first rotor connecting member 51 is shaped so as to integrally include a boss-shaped (cylindrical) axially protruding portion 51b in order to support the first rotor connecting member 51 and the first rotor Ro1 to the case DC. The axially protruding portion 51b axially protrudes from the disc-shaped member. In this example, the axially protruding portion 51b is provided so as to protrude toward the opposite side to the first planetary gear unit P1 (one axial side; the right side in FIG. 1). The first rotor bearing 16 is provided so as to support the inner peripheral surface of the axially protruding portion 51b. The first rotor bearing 16 is provided radially outside the axially protruding portion d4a of the first end support wall d4 described above. In this example, the first rotor bearing 16 is supported on the outer peripheral surface of the axially protruding portion d4a of the first end support wall d4. In other words, the first rotor Ro1 is rotatably supported by the first end support wall d4 of the case DC through the first rotor connecting member 51 and the first rotor bearing 16. The first rotor bearing 16 is provided between the inner peripheral surface of the axially protruding portion 51b of the first rotor connecting member 51 and the outer peripheral surface of the axially protruding portion d4a of the first end support wall d4.

As described above, the first input bearing 13 for supporting the input shaft I is provided radially inside the axially protruding portion d4a of the first end support wall d4 of the case DC. In the present embodiment, the first input bearing 13 provided radially inside the axially protruding portion d4a of the first end support wall d4 and the first rotor bearing 16 provided radially outside the axially protruding portion d4a are positioned so as to axially overlap each other. In the illustrated example, the first input bearing 13 and the first rotor bearing 16 are positioned coaxially with the axially protruding portion d4a radially interposed therebetween, and are positioned so as to partially overlap each other in the axial direction. In the present embodiment, a first rotation sensor 53 for detecting the rotation position of the first rotor Ro1 is positioned radially outside the axially protruding portion 51b of the first rotor connecting member 51. For example, a resolver or the like is used as the first rotation sensor 53. A rotor of the first rotation sensor 53 is fixed to the outer peripheral surface of the axially protruding portion 51b of the first rotor connecting member 51. A stator of the first rotation sensor 53 is fixed to the surface on the first motor generator MG1 side of the first end support wall d4 of the case DC. The axially protruding portion 51b of the first rotor connecting member 51 is positioned so as to axially overlap the first rotor bearing 16, the first input bearing 13, and the axially protruding portion d4a of the first end support wall d4. Accordingly, in this example, the first rotation sensor 53 is also positioned so as to axially overlap these components. The first rotor bearing 16, the first input bearing 13, the axially protruding portion d4a of the first end support wall d4, the axially protruding portion 51b of the first rotor connecting member 51, and the first rotation sensor 53, which are positioned so as to axially overlap each other, are positioned so as to axially overlap the first stator St1 of the first motor generator MG1. In this example, these components are positioned so as to axially overlap a coil end which protrudes from a core of the first stator St1 toward one axial side. The axial dimension of the hybrid drive device H can be reduced by arranging the component as described above.

In the support portion located on the other axial side, the first rotor Ro1 of the first motor generator MG1 is supported at a position radially inside the sun gear s1 of the first planetary gear unit P1 by the input shaft I. More specifically, the sun gear s1 of the first planetary gear unit P1 is supported by the input shaft I through the third rotor bearing 18. The third rotor bearing 18 is provided between the inner peripheral surface of the first sun-gear through hole 41 formed in the axial center of the sun gear s1 and the outer peripheral surface of the input shaft I. The first rotor Ro1 is integrally connected and supported through the first rotor connecting member 51 to the sun gear s1 of the first planetary gear unit P1 thus rotatably supported by the input shaft I. In other words, the first rotor Ro1 is rotatably supported by the first rotor connecting member 51 and the sun gear s1 of the first planetary gear unit P1 and by the input shaft I through the third rotor bearing 18. The sun gear s1 of the first planetary gear unit P1 is positioned radially inside the first motor generator MG1. Therefore, the third rotor bearing 18 rotatably supporting the sun gear s1 is also positioned radially inside the first motor generator MG1. The first rotor Ro1 of the first motor generator MG1 is thus supported at two axial positions, that is, a position on one axial side of the first rotor Ro1, and a position axially overlapping the first rotor Ro1.

The second motor generator MG2 is positioned on the other axial side of the output gear O, and is positioned radially outside the second planetary gear unit P2 which is also positioned on the other axial side of the output gear O. The second stator St2 of the second motor generator MG2 is fixed to the inner peripheral surface of the case peripheral wall d3 of the case DC. The second rotor Ro2 is connected integrally with the sun gear s2 of the second planetary gear unit P2 through a second rotor connecting member 52. The second rotor Ro2 is supported radially outside the second planetary gear unit P2 by the second rotor connecting member 52.

The second rotor connecting member 52 is a member provided so as to extend radially inward from the second rotor Ro2. In the present embodiment, the second rotor connecting member 52 is a disc-shaped member positioned along the radial direction and having a circular hole formed in its radial center. The second rotor connecting member 52 is positioned adjacent to the opposite side of the second planetary gear unit P2 to the first planetary gear unit P1 (the other axial side; the left side in FIG. 1). The second rotor Ro2 is fixed to the radial outer end of the second rotor connecting member 52, and the sun gear s2 of the second planetary gear unit P2 is fixed to the radial inner end of the second rotor connecting member 52. The second rotor connecting member 52 is fixed to the other axial end of the second rotor Ro2, and to the other axial end of the sun gear s2. In the present embodiment, the second rotor connecting member 52 is shaped so as to integrally include a cylindrical portion 52a in order to support the inner peripheral surface of the second rotor Ro2. The cylindrical portion 52a axially protrudes from the disc-shaped member. The cylindrical portion 52a is provided so as to protrude toward the second planetary gear unit P2 side (one axial side; the right side in FIG. 1), and the inner peripheral surface of the second rotor Ro2 is in contact with the outer peripheral surface of the cylindrical portion 52a.

As described above, by fixing the other axial end of the second rotor Ro2 to the radial outer end of the second rotor connecting member 52, a second space SP2 surrounded by the inner peripheral surface of the second rotor Ro2 (in this example, the inner peripheral surface of the cylindrical portion 52a) and the second rotor connecting member 52 is formed radially inside the second rotor Ro2. This second space SP2 is a space which opens toward the first planetary gear unit P1 side (one axial side). The second planetary gear unit P2 is entirely or partially accommodated in the second space SP2.

The second rotor Ro2 of the second motor generator MG2 is rotatably supported at two axial positions. The second rotor Ro2 is supported by the case DC at one of the two axial positions. At the other axial position, the second rotor Ro2 is supported at a position radially inside the sun gear s2 of the second planetary gear unit P2 by the fixed shaft F. In the present embodiment, the second rotor Ro2 is rotatably supported by the second end support wall d5 of the case DC through a second rotor bearing 17 in a support portion located on the other axial side. The second rotor Ro2 is also rotatably supported at a position radially inside the sun gear s2 by the fixed shaft F through a fourth rotor bearing 19 in a support portion located on one axial side. Note that, in the illustrated example, a ball bearing capable of supporting a relatively large load is used as the second rotor bearing 17. A needle bearing capable of reducing the radial thickness to a relatively small value is used as the fourth rotor bearing 19.

In the present embodiment, the second rotor connecting member 52 is shaped so as to integrally include a boss-shaped (cylindrical) axially protruding portion 52b in order to support the second rotor connecting member 52 and the second rotor Ro2 to the case DC. The axially protruding portion 52b axially protrudes from the disc-shaped member. In this example, the axially protruding portion 52b is provided so as to protrude toward the opposite side to the second planetary gear unit P2 (the other axial side; the left side in FIG. 1). The second rotor bearing 17 is provided so as to support the inner peripheral surface of the axially protruding portion 52b. The second rotor bearing 17 is provided radially outside the axially protruding portion d5a of the second end support wall d5 described above. In this example, the second rotor bearing 17 is supported on the outer peripheral surface of the axially protruding portion d5a of the second end support wall d5. In other words, the second rotor Ro2 is rotatably supported by the second end support wall d5 of the case DC through the second rotor connecting member 52 and the second rotor bearing 17. The second rotor bearing 17 is provided between the inner peripheral surface of the axially protruding portion 52b of the second rotor connecting member 52 and the outer peripheral surface of the axially protruding portion d5a of the second end support wall d5.

In the present embodiment, a second rotation sensor 54 for detecting the rotation position of the second rotor Ro2 is positioned radially outside the axially protruding portion 52b of the second rotor connecting member 52. For example, a resolver or the like is used as the second rotation sensor 54. A rotor of the second rotation sensor 54 is fixed to the outer peripheral surface of the axially protruding portion 52b of the second rotor connecting member 52. A stator of the second rotation sensor 54 is fixed to the surface on the second motor generator MG2 side of the second end support wall d5 of the case DC. The axially protruding portion 52b of the second rotor connecting member 52 is positioned so as to axially overlap the second rotor bearing 17 and the axially protruding portion d5a of the second end support wall d5. Accordingly, in this example, the second rotation sensor 54 is also positioned so as to axially overlap these components. The second rotor bearing 17, the axially protruding portion d5a of the second end support wall d5, the axially protruding portion 52b of the second rotor connecting member 52, and the second rotation sensor 54, which are positioned so as to axially overlap each other, are positioned so as to axially overlap the second stator St2 of the second motor generator MG2. In this example, these components are positioned so as to axially overlap a coil end which protrudes from a core of the second stator St2 toward the other axial side. The axial dimension of the hybrid drive device H can be reduced by arranging the component as described above.

In the support portion located on one axial side, the second rotor Ro2 of the second motor generator MG2 is supported at a position radially inside the sun gear s2 of the second planetary gear unit P2 by the fixed shaft F. More specifically, the sun gear s2 of the second planetary gear unit P2 is supported by the fixed shaft F through the fourth rotor bearing 19. The fourth rotor bearing 19 is provided between the inner peripheral surface of the second sun-gear through hole 42 formed in the axial center of the sun gear s2 and the outer peripheral surface of the fixed shaft F. The second rotor Ro2 is integrally connected and supported through the second rotor connecting member 52 to the sun gear s2 of the second planetary gear unit P2 thus rotatably supported by the fixed shaft F. In other words, the second rotor Ro2 is rotatably supported by the second rotor connecting member 52 and the sun gear s2 of the second planetary gear unit P2 and by the fixed shaft I through the fourth rotor bearing 19. The sun gear s2 of the second planetary gear unit P2 is positioned radially inside the second motor generator MG2. Therefore, the fourth rotor bearing 19 rotatably supporting the sun gear s2 is also positioned radially inside the second motor generator MG2. The second rotor Ro2 of the second motor generator MG2 is thus supported at two axial positions, that is, a position on the other axial side of the second rotor Ro2, and a position axially overlapping the second rotor Ro2.

In this hybrid drive device H, as described above, the first rotor Ro1 of the first motor generator MG1 is positioned radially outside the first planetary gear unit P1, and the first rotor connecting member 51 is positioned adjacent to the opposite side of the first planetary gear unit P1 to the second planetary gear unit P2. The second rotor Ro2 of the second motor generator MG2 is positioned radially outside the second planetary gear unit P2, and the second rotor connecting member 52 is positioned adjacent to the opposite side of the second planetary gear unit P2 to the first planetary gear unit P1. The first space SP1 formed radially inside the first motor generator MG1 and accommodating the first planetary gear unit P1 and the second space SP2 formed radially inside the second motor generator MG2 and accommodating the second planetary gear unit P2 thus open in the axial direction so that their respective opening sides face each other. In other words, the first rotor Ro1 and the first rotor connecting member 51, and the second rotor Ro2 and the second connecting member 52, are positioned so that both the first space SP1 surrounded by the inner peripheral surface of the first rotor Ro1 (in this example, the inner peripheral surface of the cylindrical portion 51a) and the first rotor connecting member 51 and the second space SP2 surrounded by the inner peripheral surface of the second rotor Ro2 (in this example, the inner peripheral surface of the cylindrical portion 52a) and the second rotor connecting member 52 open toward the output gear O.

As described above, the first rotor bearing 16 rotatably supporting the first rotor Ro1 is positioned on the outer peripheral surface of the axially protruding portion d4a of the first end support wall d4. The first rotor bearing 16 is provided so as to support the inner peripheral surface of the axially protruding portion 51b which axially protrudes from the first rotor connecting member 51. The second rotor bearing 17 rotatably supporting the second rotor Ro2 is positioned on the outer peripheral surface of the axially protruding portion d5a of the second end support wall d5, and is provided so as to support the inner peripheral surface of the axially protruding portion 52b which axially protrudes from the second rotor connecting member 52. The pair of output bearings 11, 12, on the other hand, are provided so as to support the outer peripheral surface of the extended shaft portion o2 of the output gear O. By thus arranging the bearings 11, 12, 16, 17, the pair of rotor bearings 16, 17 and the pair of output bearings 11, 12 can be made to have substantially the same diameter in the present embodiment. Accordingly, by using the same parts with the same diameter as these bearings, the number of kinds of parts is reduced, whereby reduction in cost can be achieved.

1-2-5. Planetary Gear Unit

The first planetary gear unit P1 is positioned radially inside the first motor generator MG1 so as to axially overlap the first motor generator MG1. Accordingly, like the first motor generator MG1, the first planetary gear unit P1 is positioned on one axial side (the right side in FIG. 1) of the output gear O. In the illustrated example, the first planetary gear unit P1 is positioned so as to partially overlap the first rotor Ro1 and the first stator St1 of the first motor generator MG1.

The sun gear s1 of the first planetary gear unit P1 is connected to the first rotor Ro1 through the first rotor connecting member 51. As described above, the first rotor connecting member 51 is positioned adjacent to the opposite side (one axial side) of the first planetary gear unit P1 to the second planetary gear unit P2. Accordingly, the sun gear s1 of the first planetary gear unit P1 is connected to the first rotor connecting member 51 at its end located on the opposite side to the second planetary gear unit P2 (on one axial side). The carrier ca1 of the first planetary gear unit P1 is connected to the input shaft I on the second planetary gear unit P2 side (the other axial side) of the pinion gears. In the illustrated example, a flange portion i1 is formed integrally with the input shaft I so as to protrude from the outer peripheral surface of the input shaft I, and the carrier ca1 is integrally fixed to the flange portion i1 at a position located on the second planetary gear unit P2 side (the other axial side) of the pinion gears. Thrust bearings 20 for supporting an axial load acting on the sun gear s1 and the ring gear r1 of the first planetary gear unit P1 are positioned on both axial sides of the flange portion i1.

The ring gear r1 of the first planetary gear unit P1 is connected to the output gear O through the first output connecting member 33. As described above, the first output connecting member 33 is positioned adjacent to the second planetary gear unit P2 side (the other axial side) of the first planetary gear unit P1. Accordingly, the ring gear r1 of the first planetary gear unit P1 is connected to the first output connecting member 33 at its end located on the second planetary gear unit P2 side (the other axial side). In this example, the ring gear r1 and the first output connecting member 33 are connected by spline engagement. The ring gear r1 of the first planetary gear unit P1 is connected through the first output connecting member 33 to the first connecting portion 31 provided at one axial end of the extended shaft portion o2 of the output gear O.

The second planetary gear unit P2 is positioned radially inside the second motor generator MG2 so as to axially overlap the second motor generator MG2. Accordingly, like the second motor generator MG2, the second planetary gear unit P2 is positioned on the other axial side (the left side in FIG. 1) of the output gear O. In the illustrated example, the second planetary gear unit P2 is positioned so as to entirely overlap the second rotor Ro2 and the second stator St2 of the second motor generator MG2.

The sun gear s2 of the second planetary gear unit P2 is connected to the second rotor Ro2 through the second rotor connecting member 52. As described above, the second rotor connecting member 52 is positioned adjacent to the opposite side (the other axial side) of the second planetary gear unit P2 to the first planetary gear unit P1. Accordingly, the sun gear s2 of the second planetary gear unit P2 is connected to the second rotor connecting member 52 at its end located on the opposite side to the first planetary gear unit P1 (on the other axial side). The carrier ca2 of the second planetary gear unit P2 is connected to the fixed shaft F on the first planetary gear unit P1 side (one axial side) of the pinion gears. In the illustrated example, a flange portion f1 is formed integrally with the fixed shaft F so as to protrude from the outer peripheral surface of the fixed shaft F, and the carrier ca2 is integrally fixed to the flange portion f1 at a position located on the first planetary gear unit P1 side (one axial side) of the pinion gears. Thrust bearings 21 for supporting an axial load acting on the sun gear s2 and the ring gear r2 of the second planetary gear unit P2 are positioned on both axial sides of the flange portion f1.

The ring gear r2 of the second planetary gear unit P2 is connected to the output gear O through the second output connecting member 34. As described above, the second output connecting member 34 is positioned adjacent to the first planetary gear unit P1 side (one axial side) of the second planetary gear unit P2. Accordingly, the ring gear r2 of the second planetary gear unit P2 is connected to the second output connecting member 34 at its end located on the first planetary gear unit P1 side (one axial side). In this example, the ring gear r2 and the second output connecting member 34 are connected by spline engagement. The ring gear r2 of the second planetary gear unit P2 is connected through the second output connecting member 34 to the second connecting portion 32 provided at the other axial end of the extended shaft portion o2 of the output gear O. In the present embodiment, a planetary gear unit whose axial and radial dimensions are slightly larger than those of the first planetary gear unit P1 is used as the second planetary gear unit P2.

2. Second Embodiment

Figure 4:
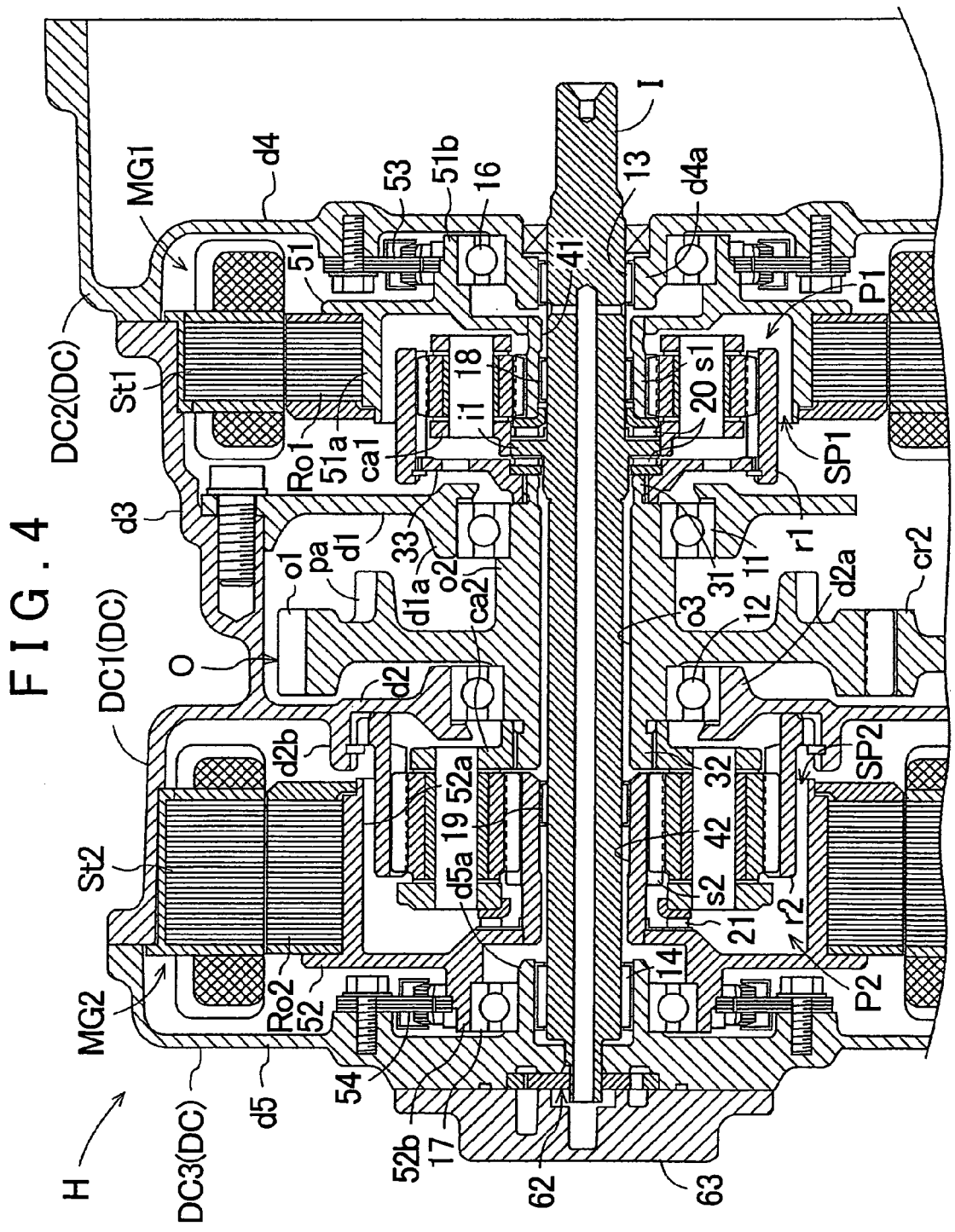
FIG. 4 is a cross-sectional view of a main part of a hybrid drive device according to a second embodiment of the present invention.
Figure 5:
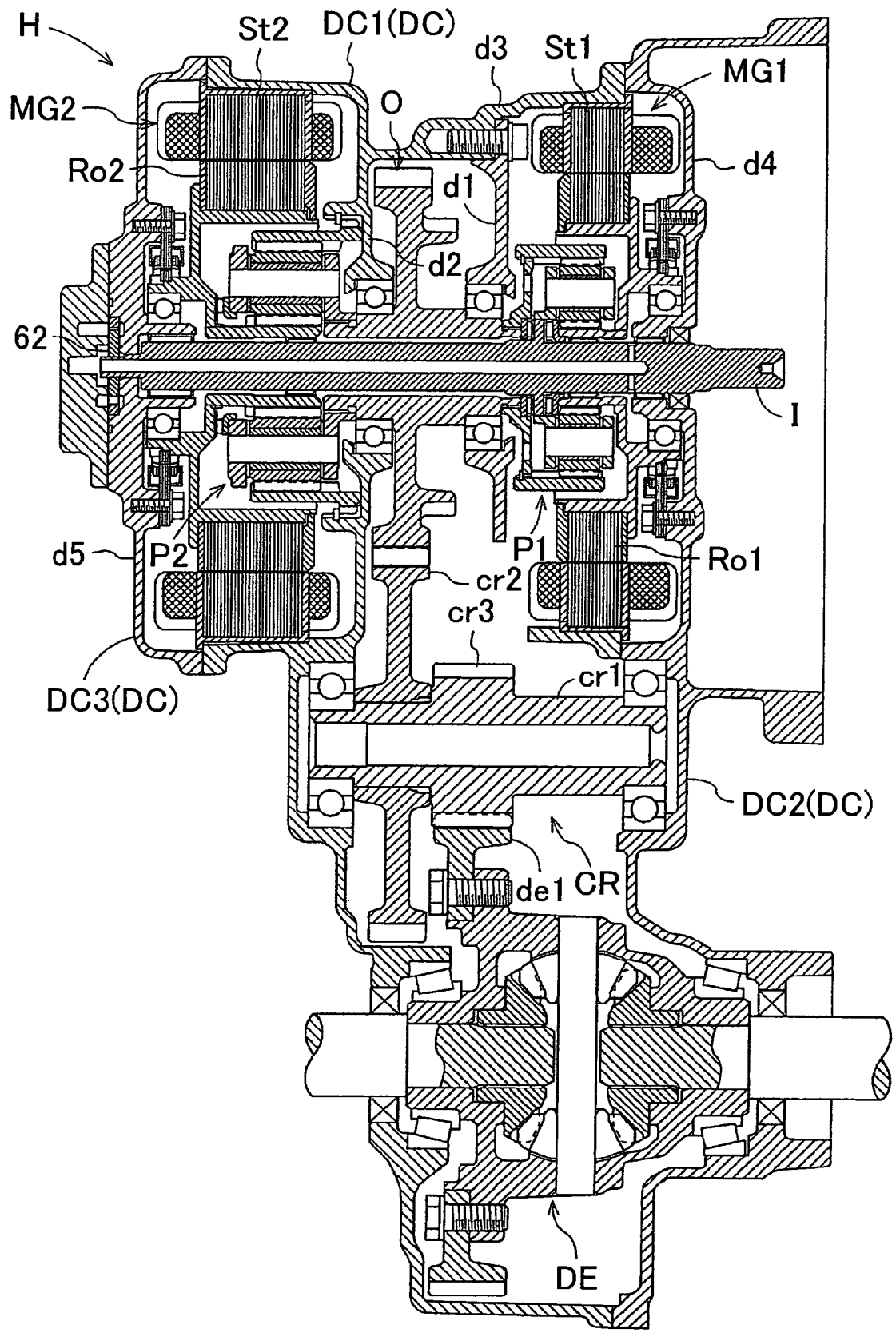
FIG. 5 is an overall cross-sectional view of the hybrid drive device according to the second embodiment of the present invention.

Hereinafter, a hybrid drive device H according to a second embodiment of the present invention will be described with reference to the drawings. FIG. 4 is a cross-sectional view of a main part of the hybrid drive device H. FIG. 5 is an overall cross-sectional view of the hybrid drive device H. As shown in these figures, the hybrid drive device H of the present embodiment is different from the first embodiment in the connection of the output gear O and the case DC as a non-rotating member to each rotating element of the second planetary gear unit P2. Accordingly, the hybrid drive device H of the present embodiment does not include the fixed shaft F of the first embodiment, and the support structure of the input shaft I is different from that of the first embodiment. In the hybrid drive device H, the structure on one axial side (the right side in FIG. 4) of the output gear main body o1 of the output gear O is the same as that in the first embodiment. Hereinafter, the hybrid drive device H of the present embodiment will be described based on the differences from the first embodiment. Note that the structure which is not specifically described below is the same as that of the first embodiment.

Like the first embodiment, a second planetary gear unit P2 is formed by a single-pinion type planetary gear unit, and a sun gear s2 of the second planetary gear unit P2 is connected so as to rotate integrally with a second rotor Ro2 of a second motor generator MG2. In the present embodiment, however, a carrier ca2 of the second planetary gear unit P2 is connected so as to rotate integrally with an output gear O. A ring gear r2 is connected to a case DC as a non-rotating member, and is fixed so as not to rotate. Since each rotating element of the second planetary gear unit P2 is connected as described above, one axial side of the output gear O is connected to a ring gear r1 as an output rotating element of a first planetary gear unit P1, and the other axial side of the output gear O is connected to the carrier ca2 as an output rotating element of the second planetary gear unit P2 in the present embodiment.

Figure 6:
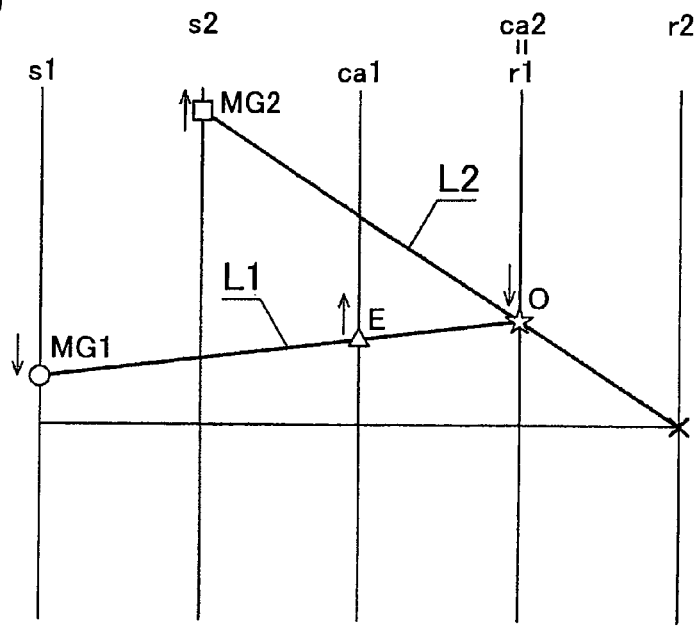
FIG. 6 is a velocity diagram showing an operation state of a first planetary gear unit and a second planetary gear unit in the hybrid drive device according to the second embodiment of the present invention.

FIG. 6 is a velocity diagram showing an operation state of the first planetary gear unit P1 and the second planetary gear unit P2 when a vehicle is running. The velocity diagram is described in the same manner as that of the first embodiment. As shown by a straight line L1 in FIG. 6, operation of each part of the first planetary gear unit P1 is the same as that of the first embodiment. Regarding the second planetary gear unit P2, however, as shown by a straight line L2 in FIG. 6, the function to reduce the rotational speed of the second motor generator MG2 to transmit the resultant rotation to the output gear O is the same as that in the first embodiment. However, a method to implement the function is different from that of the first embodiment. In other words, the ring gear r2 located at one end in the order of the rotational speed in the second planetary gear unit P2 is fixed to the case DC, and the rotational speed of the ring gear r2 is zero. In this case, the rotation speed of the sun gear s2 located at the other end in the order of the rotational speed is reduced according to the gear ratio of the second planetary gear unit P2 and then transmitted to the carrier ca2 located at an intermediate position in the order of the rotational speed. Accordingly, the second planetary gear unit P2 reduces the rotational speed of the second motor generator MG2 connected to the sun gear s2 and transmits the resultant rotation to the output gear O connected to the carrier ca2. The second motor generator MG2 then outputs a torque of a positive direction or a negative direction as appropriate in order to assist a driving force distributed from the first planetary gear unit P1 to the output gear O, according to the requested driving force from the vehicle, the running state of the vehicle, and the like. Note that, according to the structure of the second planetary gear unit P2 of the present embodiment, a larger reduction gear ratio than in the first embodiment can be used to reduce the rotational speed of the second motor generator MG2. Accordingly, in this example, a motor generator having a smaller size, more specifically, having a smaller axial dimension, than that of the first embodiment (see FIG. 1) is used as the second motor generator MG2, as shown in FIG. 4.

In the present embodiment as well, the output gear O is positioned between the first planetary gear unit P1 and the second planetary gear unit P2 in the axial direction, and includes an output gear main body o1 meshing with a counter driven gear cr2 of a counter speed-reducing mechanism CR, and an extended shaft portion o2 extended on both axial sides of the output gear main body o1 and having a smaller diameter than that of the output gear main body o1. It should be noted that an input shaft I is positioned so as to extend through a shaft insertion hole o3. The shaft insertion hole o3 is formed as a through hole in the axial center of the extended shaft portion o2 of the output gear O. In other words, the present embodiment is not structured so that an axial end of the input shaft I or the like is rotatably supported in the shaft insertion hole o3. The present embodiment is structured so that the input shaft I merely extends through the shaft insertion hole o3.

In the present embodiment, a second connecting portion 32 provided on the other axial side in the extended shaft portion o2 of the output gear O is connected to the carrier ca2 of the second planetary gear unit P2. In other words, the output gear O is formed by a separate part from the carrier ca2 of the second planetary gear unit P2, and is connected so as to rotate integrally with the carrier ca2 of the second planetary gear unit P2 through the second connecting portion 32 on the other axial side. In the present embodiment, the carrier ca2 of the second planetary gear unit P2 is directly connected to the output gear O. In other words, the carrier ca2 of the second planetary gear unit P2 is formed so as to extend radially inward from shaft members of pinion gears on the first planetary gear unit P1 side (one axial side) of the second planetary gear unit P2. A boss portion is formed in the radial center of the radially inwardly extended portion of the carrier ca2. The output gear O is connected to the boss portion through the second connecting portion 32. The carrier ca2 of the second planetary gear unit P2 is thus directly connected to the second connecting portion 32.

In the present embodiment as well, the second connecting portion 32 is a spline engagement portion which connects the output gear O and the carrier ca2 of the second planetary gear unit P2 by spline engagement. More specifically, spline engagement grooves which form the second connecting portion 32 are formed on the outer peripheral surface of the small-diameter portions at both ends of the extended shaft portion o2 of the output gear O. Spline engagement grooves which form the second connecting portion 32 are formed also on the inner peripheral surface of the boss portion of the carrier ca2 of the second planetary gear unit P2. By engagement of the spline engagement grooves, the carrier ca2 of the second planetary gear unit P2 is connected to the other axial end of the extended shaft portion o2 of the output gear O so as to rotate integrally. As in the first embodiment, the second connecting portion 32 is positioned on the second planetary gear P2 side of a second output bearing 12 which is located on the second planetary gear P2 side of the output gear O.

In the present embodiment as well, the input shaft I is connected to a carrier ca1 of the first planetary gear unit P1 in order to transmit the rotation driving force of the engine to the carrier ca1. The input shaft I is a through shaft which extends through radially inside a sun gear s1 of the first planetary gear unit P1. In the present embodiment, however, the input shaft I further extends through radially inside the output gear O and radially inside a sun gear s2 of the second planetary gear P2. In other words, the input shaft I is positioned so as not only to extend through a first sun-gear through hole 41 formed in the axial center of the sun gear s1 of the first planetary gear unit P1, but also to extend through the shaft insertion hole o3 formed as a through hole in the axial center of the extended shaft portion o2 of the output gear O, and through a second sun-gear through hole 42 formed in the axial center of the sun gear s2 of the second planetary gear unit P2. The input shaft I is supported by the case DC on both axial sides of the first planetary gear unit P1 and the second planetary gear unit P2. More specifically, the input shaft I is supported by the case DC on one axial side of the first planetary gear unit P1 and on the other axial side of the second planetary gear unit P2. In this example, the input shaft I is rotatably supported by the case DC through a first input bearing 13 on one axial side of the first planetary gear unit P1, and is rotatably supported by the case DC through a second input bearing 14 on the other axial side of the second planetary gear unit P2. In the present embodiment, one end of the input shaft I thus extends through the shaft insertion hole o3 formed in the axial center of the output gear O, and is rotatably supported by the second input bearing 14 positioned on the second motor generator MG2 side of the output gear O.

In the present embodiment, the arrangement and the support structure of the second input shaft 14 are different from those of the first embodiment. More specifically, the second input bearing 14 is supported by a second end support wall d5 positioned on the other axial side of the second motor generator MG2. In other words, the second end support wall d5 has a boss-shaped (cylindrical) axially protruding portion d5a around the input shaft I. The axially protruding portion d5a axially protrudes toward the second motor generator MG2, and the second input bearing 14 is supported radially inside the axially protruding portion d5a. The input shaft I is rotatably supported by the second end support wall d5 through the second input bearing 14. More specifically, the input shaft I is supported by the second end support wall d5 of the case DC through the second input bearing 14 provided between the inner peripheral surface of the axially protruding portion d5a of the second end support wall d5 and the outer peripheral surface of the input shaft I.

As described above, in the present embodiment, the input shaft I as a through shaft is directly supported by the case DC on both axial sides of the first planetary gear unit P1 and the second planetary gear unit P2. More specifically, the input shaft I is directly supported by the case DC through the first input bearing 13 and the second input bearing 14 on one axial side of the first planetary gear unit P1 and on the other axial side of the second planetary gear unit P2, respectively. Note that, in the present embodiment, the first input bearing 13 and the second input bearing 14 which support the input shaft I as a through shaft correspond to a through bearing in the present invention. In the present embodiment, the other axial end of the input shaft I is directly connected to a rotor of an oil pump 62 provided on the second end support wall d5 of the case DC. A flow path is formed along the axial direction in the axial center of the input shaft I so that oil discharged from the oil pump 62 flows therethrough.

As in the first embodiment, the second rotor Ro2 of the second motor generator MG2 is rotatably supported at two axial positions. The second rotor Ro2 is supported by the case DC at one of the two positions. In the present embodiment, at the other position, the second rotor Ro2 is supported at a position radially inside the sun gear s2 of the second planetary gear unit P2 by the input shaft I provided so as to extend through radially inside the sun gear s2. In other words, the second rotor Ro2 is rotatably supported at a position radially inside the sun gear s2 by the input shaft I through a fourth rotor bearing 19 in the support portion located on one axial side. More specifically, the sun gear s2 of the second planetary gear unit P2 is supported by the input shaft I through the fourth rotor bearing 19 provided between the inner peripheral surface of the second sun-gear through hole 42 formed in the axial center of the sun gear s2 and the outer peripheral surface of the input shaft I. The second rotor Ro2 is integrally connected and supported through a second rotor connecting member 52 to the sun gear s2 of the second planetary gear unit P2 thus rotatably supported by the input shaft I. In other words, the second rotor Ro2 is rotatably supported by the second rotor connecting member 52 and the sun gear s2 of the second planetary gear unit P2 and by the input shaft I through the fourth rotor bearing 19.

As described above, the second input bearing 14 for supporting the input shaft I is provided radially inside the axially protruding portion d5a of the second end support wall d5 of the case DC. In the present embodiment, the second input bearing 14 provided radially inside the axially protruding portion d5a of the second end support wall d5 and a second rotor bearing 17 provided radially outside the axially protruding portion d5a are positioned so as to axially overlap each other. In the illustrated example, the second input bearing 14 and the second rotor bearing 17 are positioned coaxially with the axially protruding portion d5a radially interposed therebetween, and are positioned so as to partially overlap each other in the axial direction. In the present embodiment, a second rotation sensor 54 for detecting the rotation position of the second rotor Ro2 is positioned radially outside an axially protruding portion 52b of the second rotor connecting member 52. More specifically, a rotor of the second rotation sensor 54 is fixed to the outer peripheral surface of the axially protruding portion 52b of the second rotor connecting member 52. A stator of the second rotation sensor 54 is fixed to the surface on the second motor generator MG2 side of the second end support wall d5 of the case DC. The axially protruding portion 52b of the second rotor connecting member 52 is positioned so as to axially overlap the second rotor bearing 17, the second input bearing 14, and the axially protruding portion d5a of the second end support wall d5. Accordingly, in this example, the second rotation sensor 54 is also positioned so as to axially overlap these components. The second rotor bearing 17, the second input bearing 14, the axially protruding portion d5a of the second end support wall d5, the axially protruding portion 52b of the second rotor connecting member 52, and the second rotation sensor 54, which are positioned so as to axially overlap each other, are positioned so as to axially overlap a second stator St2 of the second motor generator MG2. In this example, these components are positioned so as to axially overlap a coil end which protrudes from a core of the second stator St2 toward the other axial side. The axial dimension of the hybrid drive device H can be reduced by arranging the component as described above.

The second planetary gear unit P2 of the second embodiment is the same as that of the first embodiment in that the sun gear s2 is connected to the second rotor Ro2 through the second rotor connecting member 52. However, the carrier ca2 of the second planetary gear unit P2 is connected to the output gear O. The carrier ca2 of the second planetary gear unit P2 is formed so as to extend radially inward on the first planetary gear unit P1 side (one axial side) of the pinion gears. The carrier ca2 of the second planetary gear unit P2 is connected to the second connecting portion 32 provided at the other axial end of the extended shaft portion o2 of the output gear O. A thrust bearing 21 for supporting an axial load acting on the sun gear s2 of the second planetary gear unit P2 is positioned between the other axial end face of the carrier ca2 of the second planetary gear unit P2 and one axial side surface of the second rotor connecting member 52 connected to the sun gear s2 of the second planetary gear unit P2.

The ring gear r2 of the second planetary gear unit P2 is connected to the case DC as a non-rotating member, and is fixed to the case DC so as not to rotate. In the present embodiment, the ring gear r2 of the second planetary gear unit P2 is fixedly engaged with a second intermediate support wall d2 of the case DC. More specifically, the second intermediate support wall d2 has a boss-shaped (cylindrical) axially protruding portion d2b which axially protrudes toward the second planetary gear unit P2. Spline engagement grooves are formed on the inner peripheral surface of the axially protruding portion d2b. Spline engagement grooves are formed also on the outer peripheral surface of one axial end of the ring gear r2 of the second planetary gear unit P2. By engagement of the spline engagement grooves, the ring gear r2 is fixedly supported by the second intermediate support wall d2 in a non-rotatable state.

3. Other Embodiments (1) The following structure was described as a specific example in the first embodiment: the ring gear r1 of the first planetary gear unit P1 is connected to the output gear O through the first output connecting member 33 positioned on the second planetary gear unit P2 side of the first planetary gear unit P1. The ring gear r2 of the second planetary gear unit P2 is connected to the output gear O through the second output connecting member 34 provided on the first planetary gear unit P1 side of the second planetary gear unit P2. However, embodiments of the present invention are not limited to this structure. For example, like the carrier ca2 of the second planetary gear unit P2 of the second embodiment, a rotating element connected to the output gear O in one or both of the first planetary gear unit P1 and the second planetary gear unit P2 may be directly connected to the output gear O with no output connecting member interposed therebetween. This structure is also one of preferred embodiments of the present invention.

(2) The following structure was described as an example in each of the above embodiments: the output gear O is formed by a separate part from a third rotating element of the first planetary gear unit P1 and a third rotating element of the second planetary gear unit P2 to which the output gear O is connected. The output gear O is connected to the third rotating elements through the first connecting portion 31 and the second connecting portion 32, respectively. However, embodiments of the present invention are not limited to this structure. The output gear O may be integrally formed as the same part as that of one or both of the third rotating element of the first planetary gear unit P1 and the third rotating element of the second planetary gear unit P2. This structure is also one of preferred embodiments of the present invention.

(3) The following structure was described as an example in each of the above embodiments: the first connecting portion 31 and the second connecting portion 32 respectively connect the output gear O with the third rotating element of the first planetary gear unit P1 and the third rotating element of the second planetary gear unit P2. Each of the first connecting portion 31 and the second connecting portion 32 connects the corresponding two members by spline engagement so that the two members rotate integrally. However, embodiments of the present invention are not limited to this structure. For example, one or both of the first connecting portion 31 and the second connecting portion 32 may connect the corresponding two members by a key and a key groove so that the two members rotate integrally. Alternatively, flange portions respectively formed in the two members are positioned so as to face each other, and are fixedly fastened with fastening members such as bolts. This structure is also one of preferred embodiments of the present invention.

(4) The following structure was described as an example in each of the above embodiments: the first connecting portion 31 and the second connecting portion 32 are respectively provided on the outer peripheral surface of both ends of the extended shaft portion o2 of the output gear O. However, embodiments of the present invention are not limited to this structure. For example, the first connecting portion 31 and the second connecting portion 32 may be respectively provided on the inner peripheral surface of both ends of the shaft insertion hole o3 formed in the axial center of the extended shaft portion o2 of the output gear O. This structure is also one of preferred embodiments of the present invention.

(5) The following structure was described as an example in each of the above embodiments: the first connecting portion 31 is positioned on the first planetary gear unit P1 side of the first output bearing 11, and the second connecting portion 32 is positioned on the second planetary gear unit P2 side of the second output bearing 12. However, embodiments of the present invention are not limited to this structure. For example, in the case where the first connecting portion 31 and the second connecting portion 32 are provided on the inner peripheral surface of both ends of the shaft insertion hole o3, the first connecting portion 31 may be positioned so as to axially overlap the first output bearing 11, and the second connecting portion 32 may be positioned so as to axially overlap the second output bearing 12. This structure is also one of preferred embodiments of the present invention.

(6) The following structure was described as an example in each of the above embodiments: the output gear O is extended to both axial sides of the output gear main body o1, and includes the extended shaft portion o2 having a smaller diameter than the respective diameters of the first planetary gear unit P1 and the diameter of the second planetary gear unit P2. The connecting portions are respectively provided at both axial ends of the extended shaft portion o2. However, embodiments of the present invention are not limited to this structure. For example, the extended shaft portion o2 extended to one or both axial sides of the output gear O may have substantially the same diameter as, or a larger diameter than, that of one or both of the first planetary gear unit P1 and the second planetary gear unit P2. This structure is also one of preferred embodiments of the present invention. Alternatively, the output gear O may have a cylindrical shape of the same diameter as that of the output gear main body o1 without having the extended shaft portion o2. This structure is also one of preferred embodiments of the present invention. In each of the above two structures, a connecting portion is provided at both axial ends of the output gear O.

(7) The following structure was described as an example in each of the above embodiments: the first rotor connecting member 51 extended radially inward from the first rotor Ro1 of the first motor generator MG1 is positioned on the opposite side of the first planetary gear unit P1 to the second planetary gear unit P2. The second rotor connecting member 52 extended radially inward from the second rotor Ro2 of the second motor generator MG2 is positioned on the opposite side of the second planetary gear unit P2 to the first planetary gear unit P1. The first space SP1 accommodating the first planetary gear unit P1 and the second space SP2 accommodating the second planetary gear unit P2 thus open in the axial direction so that their respective opening sides face each other. However, embodiments of the present invention are not limited to this structure. The first rotor connecting member 51 may be positioned on the second planetary gear unit P2 side of the first planetary gear unit P1, or the second rotor connecting member 52 may be positioned on the first planetary gear unit P1 side of the second planetary gear unit P2 so that the first space SP1 and the second space SP2 axially open in the same direction. This structure is also one of preferred embodiments of the present invention. Alternatively, the first rotor connecting member 51 may be positioned on the second planetary gear unit P2 side of the first planetary gear unit P1 and the second rotor connecting member 52 may be positioned on the first planetary gear unit P1 side of the second planetary gear unit P2 so that the first space SP1 and the second space SP2 axially open in opposite directions from each other. This structure is also one of preferred embodiments of the present invention.

(8) The following structure was described as an example in each of the above embodiments: both the first intermediate support wall d1 and the second intermediate support wall d2 have an axially protruding portion which axially protrudes toward the output gear O, and the output bearings 11, 12 are supported by the axially protruding portions. However, embodiments of the present invention are not limited to this structure. One or both of the first intermediate support wall d1 and the second intermediate support wall d2 may have an axially protruding portion which axially protrudes in the opposite direction to the output gear O in order to support the output bearings 11, 12. This structure is also one of preferred embodiments of the present invention. In the case where the walls themselves have a sufficient thickness, it is possible that the walls have no protruding portion on either side.

(9) The following structure was described as an example in each of the above embodiments: the first intermediate support wall d1 is formed by a separate part from the main case DC1 (case DC) and is integrally attached to the case DC, while the second intermediate support wall d2 is formed integrally with the main case DC1 (case DC). However, embodiments of the present invention are not limited to this structure. For example, the first intermediate support wall d1 may be formed integrally with the case DC, and the second intermediate support wall d2 may be formed by a separate part from the case DC and integrally attached to the case DC. This structure is also one of preferred embodiments of the present invention. Alternatively, both the first intermediate support wall d1 and the second intermediate support wall d2 may be formed by separate parts from the case DC and integrally attached to the case DC. This structure is also one of preferred embodiments of the present invention.

(10) The following structure was described as an example in each of the above embodiments: one of the pair of output bearings 11, 12 is positioned so as to axially overlap the tooth surface of the output gear O. However, embodiments of the present invention are not limited to this structure. Both of the pair of output bearings 11, 12 may be positioned so as to axially overlap the tooth surface of the output gear O, or neither of the pair of output bearings 11, 12 may be positioned so as to axially overlap the tooth surface of the output gear O. This structure is also one of preferred embodiments of the present invention.

(11) The following structure was described as an example in each of the above embodiments: the first rotor bearing 16 rotatably supporting the first rotor Ro1 of the first motor generator MG1 is provided so as to support the first rotor connecting member 51 from radially inside, and the second rotor bearing 17 rotatably supporting the second rotor Ro2 of the second motor generator MG2 is provided so as to support the second rotor connecting member 52 from radially inside. However, embodiments of the present invention are not limited to this structure. The first rotor bearing 16 may be provided so as to support the first rotor connecting member 51 from radially outside, or the second rotor bearing 17 may be provided so as to support the second rotor connecting member 52 from radially outside. This structure is also one of preferred embodiments of the present invention. In this case, for example, it is preferable that the first rotor bearing 16 is provided so as to support the outer peripheral surface of the axially protruding portion 51b which axially protrudes from the first rotor connecting member 51, or the second rotor bearing 17 is provided so as to support the outer peripheral surface of the axially protruding portion 52b which axially protrudes from the second rotor connecting member 52.

(12) The following structure was described as an example in each of the above embodiments: the pair of output bearings 11, 12 are provided so as to support the outer peripheral surface of the extended shaft portion o2 of the output gear O. However, embodiments of the present invention are not limited to this structure. One or both of the pair of output bearings 11, 12 may be provided so as to support the inner peripheral surface of the extended shaft portion o2 of the output gear O. This structure is also one of preferred embodiments of the present invention.

(13) The following structure was described as an example in each of the above embodiments: the first input bearing 13 for supporting the input shaft I is provided radially inside the axially protruding portion d4a of the first end support wall d4 of the case DC. The first rotor bearing 16 for supporting the first rotor Ro1 is provided radially outside the axially protruding portion d4a. The first input bearing 13 and the first rotor bearing 16 are positioned so as to axially overlap each other. However, embodiments of the present invention are not limited to this structure. For example, the first input bearing 13 and the first rotor bearing 16 may be positioned so as not to axially overlap each other. This structure is also one of preferred embodiments of the present invention. Alternatively, the first end support wall d4 of the case DC may have two axially protruding portions, and the first input bearing 13 and the first rotor bearing 16 may be provided radially inside (or on the inner peripheral surface of) or radially outside (or on the outer peripheral surface of) the axially protruding portions, respectively. This structure is also one of preferred embodiments of the present invention. Note that the same applies to the support structure of the other axial side (the left side in FIG. 4) of the input shaft I in the second embodiment.

(14) The following structure was described as an example in each of the above embodiments: the first planetary gear unit P1 is formed by a single-pinion type planetary gear mechanism. The first motor generator MG1 is connected to the sun gear s1, the input shaft I is connected to the carrier ca1, and the output gear O is connected to the ring gear r1. However, embodiments of the present invention are not limited to this structure. The first planetary gear unit P1 may be formed by a double-pinion type planetary gear mechanism, or may be formed by a combination of a plurality of single-pinion type or double-pinion type planetary gear mechanisms. This structure is also one of preferred embodiments of the present invention. The connection of the input shaft I and the output gear O to each rotating element of the first planetary gear unit P1 may be different from that described in each of the above embodiments. For example, in the case where the first planetary gear unit P1 is formed by a double-pinion type planetary gear mechanism, it is also preferable that the first motor generator MG1 is connected to the sun gear s1, the input shaft I is connected to the ring gear r1, and the output gear O is connected to the carrier ca1. For example, in the first planetary gear unit P1 formed by a single-pinion type planetary gear mechanism, it is also possible that the first motor generator MG1 is connected to the sun gear s1, the output gear O is connected to the carrier ca1, and the input shaft I is connected to the ring gear r1.

(15) The following structure was described as an example in the first embodiment: the second planetary gear unit P2 is formed by a single-pinion type planetary gear mechanism. The second motor generator MG2 is connected to the sun gear s2, a non-rotating member is connected to the carrier ca2, and the output gear O is connected to the ring gear r2. The following structure was described as an example in the second embodiment: the second planetary gear unit P2 is formed by a single-pinion type planetary gear mechanism. The second motor generator MG2 is connected to the sun gear s2, the output gear O is connected to the carrier ca2, and a non-rotating member is connected to the ring gear r2. However, embodiments of the present invention are not limited to these structures. The second planetary gear unit P2 may be formed by a double-pinion type planetary gear mechanism, or may be formed by a combination of a plurality of single-pinion type or double-pinion type planetary gear mechanisms. This structure is also one of preferred embodiments of the present invention. Moreover, the connection of the non-rotating member and the output gear O to each rotating element of the second planetary gear unit P2 may be different from that in the each of the above embodiments. For example, in the case where the second planetary gear unit P2 is formed by a double-pinion type planetary gear mechanism, it is also preferable that the second motor generator MG2 is connected to the sun gear s2, the output gear O is connected to the ring gear r1, and the non-rotating member is connected to the carrier ca1.

Figure 7:
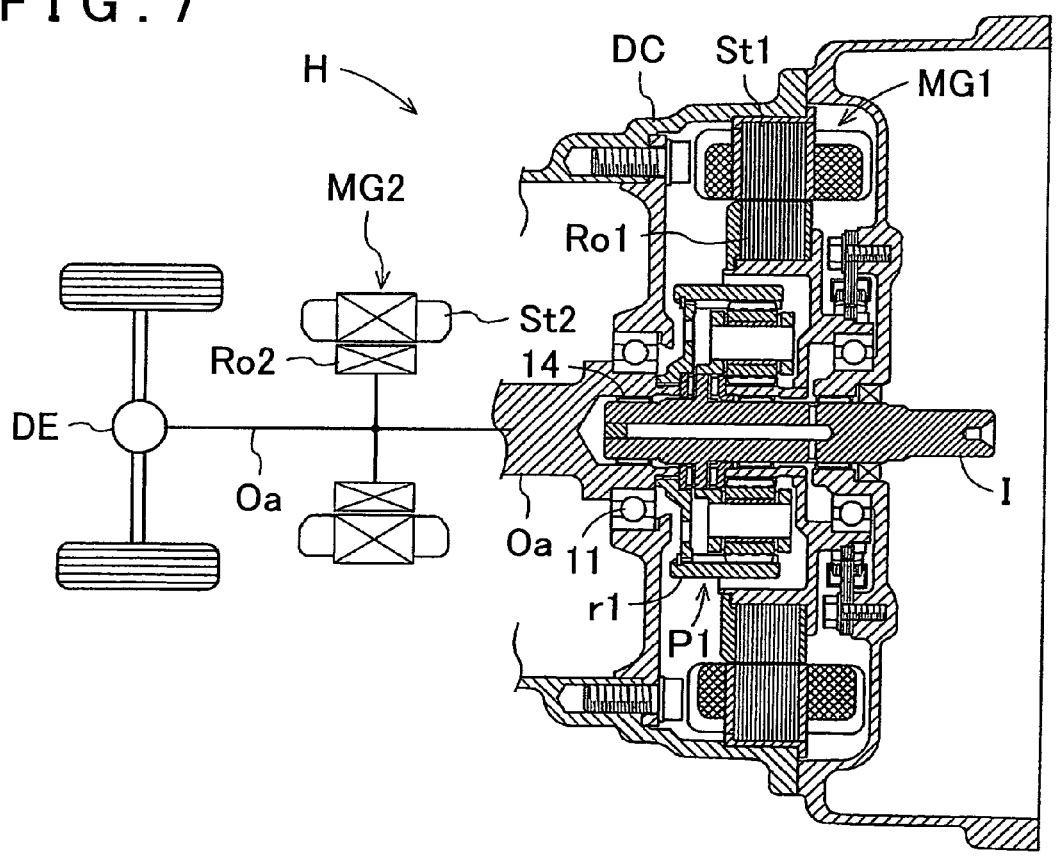
FIG. 7 is a cross-sectional view of a main part of a hybrid drive device according to another embodiment.

(16) In each of the above embodiments, a hybrid drive device H of a three-axis structure having the following three axes was described as an example of the present invention on the assumption that the present invention is applied to a hybrid drive device H which is mounted on an FF (Front Engine Front Drive) vehicle, an RR (Rear Engine Rear Drive) vehicle, or the like: a first axis on which the input shaft I, the first motor generator MG1, the second motor generator MG2, the output gear O as an output member, the first planetary gear unit P1, and the second planetary gear unit P2 are positioned; a second axis on which the counter speed-reducing mechanism CR is positioned; and a third axis on which the differential unit DE is positioned. However, embodiments of the present invention are not limited to this. For example, the hybrid drive device H of the present invention may be a hybrid drive device H of a single-axis structure in which all of the input shaft I, the first motor generator MG1, the second motor generator MG2, the first planetary gear unit P1, the output member, and the differential unit DE are positioned coaxially, and which is preferably applicable to a hybrid drive device H which is mounted on an FR (Front Engine Rear Drive) vehicle. Such a hybrid drive device H is also one of preferred embodiments of the present invention. An example of this hybrid drive device H is shown in FIG. 7. In this example, the arrangement and the connection of the input shaft I, the first motor generator MG1, and the first planetary gear unit P1, and the support structure of the first rotor Ro1 of the first motor generator MG1 are basically the same as those of the first embodiment. However, a member to which the ring gear r1 of the first planetary gear unit P1 is connected is different from the first embodiment. More specifically, the ring gear r1 as an output rotating element of the first planetary gear unit P1 is connected to an output shaft Oa as an output member positioned coaxially with the input shaft I. The input shaft I as a through shaft is rotatably supported by the case DC through the second input bearing 14, the output shaft Oa, and the output bearing 11. The second motor generator MG2 is connected to the output shaft Oa, whereby the second motor generator MG2 can assist the rotation driving force of the input shaft I which has been output through the first planetary gear unit P1. The differential unit DE is also connected to the output shaft Oa. The differential unit DE distributes the rotation driving force of the output shaft Oa to the right and left wheels. Note that FIG. 7 shows only a main part of the present invention in detail, and the structure on the wheel side of the output shaft Oa on the power transmission path is not shown in FIG. 7.

(17) In an example described in each of the above embodiments, the present invention is applied to a hybrid drive device H for hybrid vehicles having an engine and rotating electrical machines as a driving force source. However, embodiments of the present invention are not limited to this. For example, the present invention may be applied to a drive device for electric vehicles having only rotating electrical machines as a driving force source. This is also one of preferred embodiments of the present invention.

The present invention can be preferably used in a drive device for use in vehicles having rotating electrical machines as a driving force source, such as an electric vehicle and a hybrid vehicle.

In the present application, the term "connect" or "connection" includes a structure directly connecting two members to be connected, and a structure indirectly connecting the two members through one or more other members. In the present application, the term "rotating electrical machine" is used as a concept including a motor (electric motor), a generator (electric generator), and a motor generator functioning as both a motor and a generator as required.

The state in which a member "is supported by the case" includes both the state in which the member is directly supported by the case, and the state in which the member is indirectly supported by the case. The phrase "directly supported by the case" means that a member to be supported is directly fixedly supported by the case, or the member is supported by the case with only a bearing interposed therebetween. The phrase "indirectly supported by the case" means that the member is supported by the case with a member other than a bearing interposed therebetween.

According to an exemplary aspect of the invention, the planetary gear unit is positioned radially inside the rotating electrical machine so as to axially overlap the rotating electrical machine. Therefore, the overall axial dimension of the drive device can be reduced, whereby the size of the drive device can be reduced. Since the through shaft is supported by the case on both axial sides of the planetary gear unit, high axial center accuracy of the through shaft can be assured. Moreover, the rotor of the rotating electrical machine is supported by the case on one axial side, and is supported by the through shaft reliably having high axial center accuracy on the other axial side. Reduction in axial center accuracy of the rotor shaft can therefore be minimized.

Accordingly, the overall size of the drive device can be reduced while maintaining high axial center accuracy of the rotor shaft.

According to an exemplary aspect of the invention, the rotor of the rotating electrical machine can be reliably rotatably supported by the through shaft through the rotor bearing at a position radially inside the sun gear.

According to an exemplary aspect of the invention, the rotor of the rotating electrical machine can be rotatably supported by the case through the rotor bearing at a position radially inside the axially protruding portion of the rotor connecting member on one axial side of the planetary gear unit. Moreover, another member can be connected to a carrier and a ring gear of the planetary gear unit on the other axial side of the planetary gear unit.

According to an exemplary aspect of the invention, the through shaft is directly fixedly supported by the case as a fixed member on at least one axial side, or is supported by the case with only a bearing interposed therebetween. Therefore, the axial center accuracy of the through shaft can be increased as compared to the case where the through shaft is indirectly supported by the case on both axial sides. Accordingly, high axial center accuracy of the rotor shaft can also be maintained.

According to an exemplary aspect of the invention, the through shaft can be rotatably supported by the case through the through bearing on both radial sides of the axially protruding portion of the support wall. At the same time, the rotor of the rotating electrical machine can be rotatably supported by the case through the rotor bearing. In this case, the through shaft and the rotor of the rotating electrical machine are directly supported from both radial sides by the case as a fixed member through the axially protruding portion. Therefore, the overall axial center accuracy of the through shaft and the rotor of the rotating electrical machine can be improved.

According to an exemplary aspect of the invention, the through bearing and the rotor bearing are positioned on both radial sides of the axially protruding portion of the support wall so as to axially overlap each other. Therefore, the overall axial dimension of the drive device can be reduced by the axial overlap.

According to an exemplary aspect of the invention, the rotation sensor is positioned in the space formed radially outside the axially protruding portion of the rotor connecting member. Therefore, the space in the case can be effectively used, whereby the overall size of the drive device can be reduced.

According to an exemplary aspect of the invention, the rotation sensor and the rotor of the rotating electrical machine are positioned so as to axially overlap each other. Therefore, the overall axial dimension of the drive device can be reduced by the axial overlap.

According to an exemplary aspect of the invention, the rotation driving force which is output from the output rotating element of the planetary gear unit can be output to the downstream side on a power transmission path through the output member. Moreover, one end of the through shaft inserted in the shaft insertion hole formed in the axial center of the output member can be indirectly supported by the case through the through bearing, the output member, and the output bearing. Accordingly, the through shaft can be appropriately supported by the case at an axially overlapping position with the output member.

According to an exemplary aspect of the invention, the rotation driving force which is output from the output rotating element of the planetary gear unit can be output to the downstream side on a power transmission path through the output member. Moreover, one end of the through shaft inserted in the shaft insertion hole formed in the axial center of the output member can be directly supported by the case through the through bearing. Accordingly, the through shaft can be appropriately supported by the case.

According to an exemplary aspect of the invention, the rotation driving force of the engine which is input from the input shaft can be distributed to the output member and the rotating electrical machine through the planetary gear unit. Accordingly, by controlling the rotational speed of the rotating electrical machine, the rotation driving force of the engine which is input from the input shaft can be continuously shifted, whereby drive power can be transmitted to the wheel side through the output member.

What is claimed is:

1. A drive device, comprising:
   a rotating electrical machine;
   a planetary gear unit positioned radially inside the rotating electrical machine so as to axially overlap the rotating electrical machine;
   a through shaft extending radially inside and through a sun gear of the planetary gear unit; and
   a case that accommodates the rotating electrical machine and the planetary gear unit, wherein:
   the through shaft is supported by the case on both axial sides of the planetary gear unit,
   a rotor of the rotating electrical machine is connected integrally with the sun gear and is rotatably supported at two axial positions, the rotor is radially supported at a first axial position of the two axial positions by the case directly, and the rotor is supported at a second axial position of the two axial positions at a position radially inside the sun gear by the through shaft,
   the rotor of the rotating electrical machine is positioned on one axial side of the planetary gear unit, and is connected to the sun gear through a rotor connecting member that extends radially inward from the rotor,
   the rotor connecting member has an axially protruding portion that axially protrudes to an opposite axial side of the planetary gear unit, and
   the rotor is radially supported by the case at the first axial position at an inner peripheral surface of the axially protruding portion of the rotor connecting member.

2. The drive device according to claim 1, wherein:
   the through shaft extends through a sun gear through hole formed in an axial center of the sun gear, and
   the rotor is supported by the through shaft through a rotor bearing provided between an inner peripheral surface of the sun gear through hole and an outer peripheral surface of the through shaft.

3. The drive device according to claim 1,
   wherein the rotor is supported by the case through a rotor bearing provided so as to support the inner peripheral surface of the axially protruding portion of the rotor connecting member.

4. The drive device according to claim 1, wherein the through shaft is directly supported by the case on at least one axial side of the planetary gear unit.

5. The drive device according to claim 1, wherein:
   the case has a support wall provided on one axial side of the rotating electrical machine,
   the support wall has an axially protruding portion that axially protrudes toward the rotating electrical machine, the through shaft is supported by the support wall through a through bearing provided radially inside the axially protruding portion of the support wall, and the rotor is supported by the support wall through a rotor bearing provided radially outside the axially protruding portion of the support wall.

6. The drive device according to claim 5, wherein the through bearing provided radially inside the axially protruding portion of the support wall and the rotor bearing provided radially outside the axially protruding portion of the support wall are positioned so as to axially overlap each other.

7. The drive device according to claim 3, wherein a rotation sensor that detects a rotation position of the rotor is positioned radially outside the axially protruding portion of the rotor connecting member.

8. The drive device according to claim 7, wherein the rotation sensor and a stator of the rotating electrical machine are positioned so as to axially overlap each other.

9. The drive device according to claim 1, further comprising:

an output member connected to an output rotating element of the planetary gear unit, and having a shaft insertion hole formed in an axial center thereof, wherein:

the output member is rotatably supported by the case through an output bearing that is supported by the case at a position radially outside the shaft insertion hole, and one end of the through shaft is inserted into the shaft insertion hole, and is rotatably supported by an inner peripheral surface of the shaft insertion hole through a through bearing provided between the inner peripheral surface of the shaft insertion hole and an outer peripheral surface of the through shaft.

10. The drive device according to claim 1, further comprising:

an output member connected to an output rotating element of the planetary gear unit, and having a shaft insertion hole formed in an axial center thereof, wherein one end of the through shaft extends through the shaft insertion hole, and is rotatably supported by the case through a through bearing that is supported by the case on an opposite side of the output member to the planetary gear unit in an axial direction.

11. The drive device according to claim 1, wherein:

the through shaft is an input shaft connected to an engine, the drive device further comprises an output member positioned on a wheel side of the input shaft and the rotating electrical machine on a power transmission path, and the rotating electrical machine is connected to the sun gear of the planetary gear unit, the input shaft is connected to a carrier of the planetary gear unit, and the output member is connected to a ring gear of the planetary gear unit.

12. The drive device according to claim 2, wherein the rotor is supported by the case through a rotor bearing provided so as to support the inner peripheral surface of the axially protruding portion of the rotor connecting member.

13. The drive device according to claim 12, wherein the through shaft is directly supported by the case on at least one axial side of the planetary gear unit.

14. The drive device according to claim 13, wherein:

the case has a support wall provided on one axial side of the rotating electrical machine, the support wall has an axially protruding portion that axially protrudes toward the rotating electrical machine, the through shaft is supported by the support wall through a through bearing provided radially inside the axially protruding portion of the support wall, and the rotor is supported by the support wall through a rotor bearing provided radially outside the axially protruding portion of the support wall.

15. The drive device according to claim 14, wherein the through bearing provided radially inside the axially protruding portion of the support wall and the rotor bearing provided radially outside the axially protruding portion of the support wall are positioned so as to axially overlap each other.

16. The drive device according to claim 2, wherein the through shaft is directly supported by the case on at least one axial side of the planetary gear unit.

17. The drive device according to claim 2, wherein:

the case has a support wall provided on one axial side of the rotating electrical machine, the support wall has an axially protruding portion that axially protrudes toward the rotating electrical machine, the through shaft is supported by the support wall through a through bearing provided radially inside the axially protruding portion of the support wall, and the rotor is supported by the support wall through a rotor bearing provided radially outside the axially protruding portion of the support wall.

18. The drive device according to claim 17, wherein the through bearing provided radially inside the axially protruding portion of the support wall and the rotor bearing provided radially outside the axially protruding portion of the support wall are positioned so as to axially overlap each other.

19. The drive device according to claim 12, wherein a rotation sensor that detects a rotation position of the rotor is positioned radially outside the axially protruding portion of the rotor connecting member.

20. The drive device according to claim 19, wherein the rotation sensor and a stator of the rotating electrical machine are positioned so as to axially overlap each other.

* * * * *